(12) United States Patent
Melrose

(10) Patent No.: US 9,969,517 B2
(45) Date of Patent: *May 15, 2018

(54) SYSTEMS AND METHODS FOR HANDLING PLASTIC CONTAINERS HAVING A DEEP-SET INVERTIBLE BASE

(71) Applicant: CO2 PAC Ltd., Auckland (NZ)

(72) Inventor: David Murray Melrose, Auckland (NZ)

(73) Assignee: CO2PAC LIMITED, Auckland (NZ)

( * ) Notice: Subject to any disclaimer, the term of this patent is extended or adjusted under 35 U.S.C. 154(b) by 868 days.

This patent is subject to a terminal disclaimer.

(21) Appl. No.: 13/752,377

(22) Filed: Jan. 28, 2013

(65) Prior Publication Data

US 2014/0026522 A1   Jan. 30, 2014
US 2018/0099771 A9   Apr. 12, 2018

Related U.S. Application Data

(63) Continuation of application No. 13/476,997, filed on May 21, 2012, now abandoned, which is a
(Continued)

(30) Foreign Application Priority Data

Sep. 30, 2002   (NZ) ........................................ 521694

(51) Int. Cl.
  *B65B 61/24*   (2006.01)
  *B65D 1/02*   (2006.01)
  (Continued)

(52) U.S. Cl.
  CPC ............ *B65B 61/24* (2013.01); *B29C 49/541* (2013.01); *B65B 3/04* (2013.01); *B65B 39/12* (2013.01);
  (Continued)

(58) Field of Classification Search
  CPC .... B65D 79/005; B65D 1/0276; B65B 55/12; B65B 55/14; B65B 61/24; B65B 63/08;
  (Continued)

(56) References Cited

U.S. PATENT DOCUMENTS 1,499,239 A    6/1924   Malmquist
D110,624 S    7/1938   Mekeel, Jr.
(Continued)

FOREIGN PATENT DOCUMENTS

CA    2077717    3/1993
DE    1302048    10/1969
(Continued)

OTHER PUBLICATIONS

U.S. Appl. No. 10/851,083, US File History, now U.S. Pat. No. 7,543,713.
(Continued)

*Primary Examiner* — Stephen F Gerrity
(74) *Attorney, Agent, or Firm* — Henricks, Slavin & Holmes LLP

(57) ABSTRACT

A plastic container comprises an upper portion including a finish defining an opening into the container, a lower portion including a base defining a standing surface, a sidewall extending between the upper portion and the lower portion, the sidewall defining a longitudinal axis, and at least one substantially transversely-oriented pressure panel located in the lower portion. The pressure panel is movable between an outwardly-inclined position and an inwardly-inclined position to compensate for a change of pressure inside the container. The standing surface defines a standing plane, and the entire pressure panel is located between the standing plane and the upper portion of the container when the pressure panel is in the outwardly-inclined position.

35 Claims, 19 Drawing Sheets

Related U.S. Application Data continuation-in-part of application No. 13/415,831, filed on Mar. 8, 2012, now Pat. No. 9,731,884, which is a continuation-in-part of application No. 11/704,368, filed on Feb. 9, 2007, now Pat. No. 8,584,879, which is a continuation-in-part of application No. 10/529,198, filed as application No. PCT/NZ03/00220 on Sep. 30, 2003, now Pat. No. 8,152,010, said application No. 13/415,831 is a continuation of application No. 13/412,572, filed on Mar. 5, 2012, now Pat. No. 9,145,223, which is a continuation-in-part of application No. 11/704,338, filed on Feb. 9, 2007, now Pat. No. 8,127,955, which is a continuation-in-part of application No. 10/529,198, filed as application No. PCT/NZ03/00220 on Sep. 30, 2003, now Pat. No. 8,152,010, said application No. 13/415,831 is a continuation-in-part of application No. 11/413,124, filed on Apr. 28, 2006, now Pat. No. 8,381,940, which is a continuation-in-part of application No. 10/529,198, filed as application No. PCT/NZ03/00220 on Sep. 30, 2003, now Pat. No. 8,152,010.

(51) Int. Cl.
  *B65D 79/00* (2006.01)
  *B67C 3/22* (2006.01)
  *B65B 63/08* (2006.01)
  *B67C 3/04* (2006.01)
  *B65B 39/12* (2006.01)
  *B65B 3/04* (2006.01)
  *B29C 49/54* (2006.01)
  *B29C 49/06* (2006.01)
  *B29C 49/12* (2006.01)
  *B29C 49/48* (2006.01)

(52) U.S. Cl.
  CPC ............ *B65B 63/08* (2013.01); *B65D 1/0276* (2013.01); *B65D 1/0284* (2013.01); *B65D 79/005* (2013.01); *B29C 49/06* (2013.01); *B29C 49/12* (2013.01); *B29C 2049/4892* (2013.01); *B65B 2220/24* (2013.01); *B65D 2501/0036* (2013.01); *B67C 3/045* (2013.01); *B67C 2003/226* (2013.01)

(58) Field of Classification Search
  CPC .......... B65B 2220/24; B67C 2003/226; B67C 3/223; B67C 3/045
  USPC .................. 53/440, 471; 215/373, 376, 381; 220/606, 608, 609
  See application file for complete search history.

(56) References Cited

U.S. PATENT DOCUMENTS

| | | |
|---|---|---|
| 2,124,959 A | 7/1938 | Vogel |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrison |
| 3,043,461 A | 7/1962 | Glassco |
| 3,081,002 A | 3/1963 | Tauschinski et al. |
| 3,174,655 A | 3/1965 | Hurschman |
| 3,301,293 A | 1/1967 | Santelli |
| 3,334,764 A | 8/1967 | Fouser |
| 3,397,724 A | 8/1968 | Bolen et al. |
| 3,409,167 A | 11/1968 | Blanchard |
| 3,426,939 A | 2/1969 | Young |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,883,033 A | 5/1975 | Brown |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor |
| 3,942,673 A | 3/1976 | Lyu et al. |
| 3,949,033 A | 4/1976 | Uhlig |
| 3,956,441 A | 5/1976 | Uhlig |
| 3,979,009 A * | 9/1976 | Walker ............... B65D 1/46 220/609 |
| 4,036,926 A | 7/1977 | Chang |
| 4,037,752 A | 7/1977 | Dulmaine et al. |
| 4,079,111 A | 3/1978 | Uhlig |
| 4,117,062 A | 9/1978 | Uhlig |
| 4,120,419 A * | 10/1978 | Saunders ............... B65D 1/165 220/609 |
| 4,125,632 A | 11/1978 | Vosti et al. |
| 4,134,510 A | 1/1979 | Chang |
| 4,170,622 A | 10/1979 | Uhlig et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,321,483 A | 3/1982 | Dugan |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla |
| 4,381,061 A | 4/1983 | Cerny et al. |
| D269,158 S | 5/1983 | Gaunt et al. |
| 4,386,701 A | 6/1983 | Galer |
| 4,412,866 A | 11/1983 | Schoenrock et al. |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,492,313 A | 1/1985 | Touzani |
| 4,497,855 A | 2/1985 | Agrawal |
| 4,542,029 A | 9/1985 | Caner et al. |
| 4,577,775 A * | 3/1986 | Kresin ............... B65D 1/265 220/604 |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,749,092 A | 6/1988 | Sugiura et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,865,211 A | 9/1989 | Hollingsworth |
| 4,867,323 A | 9/1989 | Powers |
| 4,875,576 A | 10/1989 | Torgrimson et al. |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,967,538 A | 11/1990 | Leftault et al. |
| 4,976,538 A | 12/1990 | Ake |

(56) References Cited

U.S. PATENT DOCUMENTS

| | | |
|---|---|---|
| 4,978,015 A | 12/1990 | Walker |
| 4,997,692 A | 3/1991 | Yoshino |
| 5,004,109 A | 4/1991 | Bartley |
| 5,005,716 A | 4/1991 | Eberle |
| 5,014,868 A | 5/1991 | Wittig et al. |
| 5,024,340 A | 6/1991 | Alberghini et al. |
| 5,060,453 A | 10/1991 | Alberghini et al. |
| 5,064,081 A | 11/1991 | Hayashi |
| 5,067,622 A | 11/1991 | Garver et al. |
| 5,090,180 A | 2/1992 | Sorensen |
| 5,092,474 A | 3/1992 | Leigner |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood et al. |
| 5,217,737 A | 6/1993 | Gygax et al. |
| 5,226,551 A | 7/1993 | Robbins, III |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,269,428 A | 12/1993 | Gilbert |
| 5,279,433 A | 1/1994 | Krishnakumar et al. |
| 5,281,387 A | 1/1994 | Collette et al. |
| 5,292,242 A | 3/1994 | Robbins, III |
| 5,310,068 A | 5/1994 | Saghri |
| 5,333,761 A | 8/1994 | Davis et al. |
| 5,341,946 A | 8/1994 | Vailliencourt et al. |
| 5,392,937 A | 2/1995 | Prevot |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,573,129 A | 11/1996 | Nagata et al. |
| 5,593,063 A | 1/1997 | Claydon et al. |
| 5,598,941 A | 2/1997 | Semersky |
| 5,632,397 A | 5/1997 | Fandeux et al. |
| 5,642,826 A | 7/1997 | Melrose |
| 5,672,730 A | 9/1997 | Cottman |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppmann, Sr. |
| 5,737,827 A | 4/1998 | Kuse et al. |
| 5,746,339 A | 5/1998 | Petre et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko |
| 5,829,614 A | 11/1998 | Collette et al. |
| 5,858,300 A | 1/1999 | Shimizu et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle et al. |
| 5,976,653 A | 11/1999 | Collette et al. |
| RE36,639 E | 4/2000 | Okhai |
| 6,065,624 A | 5/2000 | Steinke |
| 6,077,554 A | 6/2000 | Wiemann et al. |
| 6,105,815 A | 8/2000 | Mazda |
| 6,176,382 B1 | 1/2001 | Bazlur |
| 6,213,325 B1 | 4/2001 | Cheng et al. |
| 6,228,317 B1 | 5/2001 | Smith et al. |
| 6,230,912 B1 | 5/2001 | Rashid |
| 6,277,321 B1 | 8/2001 | Vailliencourt et al. |
| 6,290,094 B1 | 9/2001 | Arnold et al. |
| 6,298,638 B1 | 10/2001 | Bettle |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot |
| 6,467,639 B2 | 10/2002 | Mooney |
| 6,485,669 B1 | 11/2002 | Boyd et al. |
| 6,502,369 B1 | 1/2003 | Andison et al. |
| 6,514,451 B1 | 2/2003 | Boyd et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,662,960 B2 | 12/2003 | Hong et al. |
| 6,749,780 B2 | 6/2004 | Tobias |
| 6,763,968 B1 | 7/2004 | Boyd et al. |
| 6,769,561 B2 | 8/2004 | Futral et al. |
| 6,779,673 B2 | 8/2004 | Melrose |
| 6,923,334 B2 | 8/2005 | Melrose et al. |
| 6,935,525 B2 | 8/2005 | Trude |
| 6,942,116 B2 | 9/2005 | Lisch et al. |
| 6,983,858 B2 | 1/2006 | Slat et al. |
| 7,051,889 B2 | 5/2006 | Boukobza |
| 7,077,279 B2 | 7/2006 | Melrose |
| 7,137,520 B1 | 11/2006 | Melrose |
| 7,150,372 B2 | 12/2006 | Lisch et al. |
| 7,159,374 B2 | 1/2007 | Abercrombie, III et al. |
| 7,416,088 B2 | 8/2008 | Boukobza |
| 7,520,400 B2 | 4/2009 | Young et al. |
| 7,543,713 B2 | 6/2009 | Trude |
| 7,717,282 B2 | 5/2010 | Melrose |
| 7,900,425 B2 * | 3/2011 | Bysick et al. ........ B65D 1/0276 215/373 |
| 7,980,404 B2 | 7/2011 | Trude et al. |
| 8,028,498 B2 * | 10/2011 | Melrose ................ B65D 1/0276 215/376 |
| 8,047,389 B2 | 11/2011 | Melrose |
| 8,127,955 B2 | 3/2012 | Denner et al. |
| 8,152,010 B2 | 4/2012 | Melrose |
| 8,381,496 B2 | 2/2013 | Trude |
| 8,381,940 B2 | 2/2013 | Melrose |
| 8,529,975 B2 | 9/2013 | Trude |
| 8,584,879 B2 | 11/2013 | Denner |
| 8,726,616 B2 * | 5/2014 | Bysick et al. ........ B65D 1/0276 53/440 |
| 8,839,972 B2 | 9/2014 | Trude |
| 9,145,223 B2 | 9/2015 | Melrose et al. |
| 9,624,018 B2 * | 4/2017 | Melrose ................ B65D 1/0276 |
| 9,731,884 B2 * | 8/2017 | Melrose ................ B65D 1/0276 |
| 2001/0035391 A1 | 11/2001 | Young et al. |
| 2002/0000421 A1 | 1/2002 | Ota et al. |
| 2002/0074336 A1 | 6/2002 | Silvers |
| 2002/0096486 A1 | 7/2002 | Bourgue et al. |
| 2002/0153343 A1 | 10/2002 | Tobias et al. |
| 2002/0158038 A1 | 10/2002 | Heisel et al. |
| 2003/0015491 A1 | 1/2003 | Melrose |
| 2003/0121881 A1 | 7/2003 | Higuchi |
| 2003/0173327 A1 | 9/2003 | Melrose |
| 2003/0186006 A1 | 10/2003 | Schmidt et al. |
| 2003/0196926 A1 | 10/2003 | Tobias et al. |
| 2003/0217947 A1 | 11/2003 | Ishikawa et al. |
| 2003/0221987 A1 * | 12/2003 | Trude ................... B65D 1/0276 206/508 |
| 2004/0016716 A1 | 1/2004 | Melrose |
| 2004/0074864 A1 | 4/2004 | Melrose |
| 2004/0149677 A1 | 8/2004 | Slat et al. |
| 2004/0173565 A1 | 9/2004 | Semersky et al. |
| 2004/0173656 A1 | 9/2004 | Seong |
| 2004/0211746 A1 | 10/2004 | Trude |
| 2004/0232103 A1 | 11/2004 | Lisch et al. |
| 2006/0006133 A1 | 1/2006 | Lisch et al. |
| 2006/0118508 A1 * | 6/2006 | Kraft et al. .......... B65D 1/0276 215/374 |
| 2006/0138074 A1 | 6/2006 | Melrose |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |

(56) References Cited

U.S. PATENT DOCUMENTS

| | | |
|---|---|---|
| 2007/0017892 A1 | 1/2007 | Melrose |
| 2007/0045312 A1 | 3/2007 | Abercrombie, III et al. |
| 2007/0051073 A1 | 3/2007 | Kelley et al. |
| 2007/0084821 A1 * | 4/2007 | Bysick et al. ....... B65D 1/0276 215/373 |
| 2007/0125743 A1 | 6/2007 | Pritchett et al. |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2008/0298938 A1 | 12/2008 | Melrose |
| 2011/0113731 A1 * | 5/2011 | Bysick et al. ....... B65D 1/0276 53/440 |
| 2011/0147392 A1 | 6/2011 | Trude et al. |
| 2012/0132611 A1 | 5/2012 | Trude |
| 2012/0292284 A1 | 11/2012 | Melrose |
| 2013/0000259 A1 | 1/2013 | Trude |
| 2013/0043208 A1 | 2/2013 | Denner et al. |
| 2013/0312368 A1 | 11/2013 | Melrose |
| 2014/0123603 A1 | 5/2014 | Denner |
| 2014/0165504 A1 * | 6/2014 | Melrose ............... B65D 1/0276 53/436 |
| 2014/0166676 A1 | 6/2014 | Melrose |
| 2016/0075496 A1 | 3/2016 | Melrose |

FOREIGN PATENT DOCUMENTS

| | | | |
|---|---|---|---|
| DE | 1586488 A1 * | 1/1972 | ........... B65D 79/005 |
| DE | 1761753 | 1/1972 | |
| DE | 2102319 A1 * | 8/1972 | ........... B65D 79/005 |
| DE | 32 15 866 | 11/1983 | |
| EP | 0 521642 | 1/1993 | |
| EP | 0551788 | 7/1993 | |
| EP | 0 666 222 | 9/1995 | |
| EP | 0609348 | 1/1997 | |
| EP | 0916406 | 5/1999 | |
| EP | 0957030 | 11/1999 | |
| EP | 1063076 | 12/2000 | |
| EP | 1565381 | 8/2005 | |
| FR | 1119542 A * | 6/1956 | ........... B65D 79/005 |
| FR | 1571499 | 6/1969 | |
| FR | 2503665 A1 * | 10/1982 | ........... B65D 79/005 |
| FR | 2607109 | 5/1988 | |
| GB | 781103 | 8/1957 | |
| GB | 1113988 | 5/1968 | |
| GB | 2050919 | 1/1981 | |
| GB | 2372977 | 9/2002 | |
| GE | 2000-677 | 8/2000 | |
| JP | 48-31050 | 9/1973 | |
| JP | 49-28628 | 7/1974 | |
| JP | 54-72181 | 6/1979 | |
| JP | 56-072730 | 6/1981 | |
| JP | 57-37827 | 2/1982 | |
| JP | 63-189224 | 8/1988 | |
| JP | 64-009146 | 1/1989 | |
| JP | 03-043342 | 2/1991 | |
| JP | 03-076625 | 4/1991 | |
| JP | 04339751 A * | 11/1992 | ............. B65D 1/26 |
| JP | 05-193694 | 8/1993 | |
| JP | 06-98979 | 12/1994 | |
| JP | 06-336238 | 12/1994 | |
| JP | 07-300121 | 11/1995 | |
| JP | 8053115 A | 2/1996 | |
| JP | 08253220 | 10/1996 | |
| JP | 09-039934 | 2/1997 | |
| JP | 09110045 | 4/1997 | |
| JP | 10-167226 | 6/1998 | |
| JP | 10-181734 | 7/1998 | |
| JP | 10-230919 | 9/1998 | |
| JP | 11193016 A * | 7/1999 | ........... B65D 79/005 |
| JP | 2000-168756 | 6/2000 | |
| JP | 2000229615 | 8/2000 | |
| JP | 2002-127237 | 5/2002 | |
| JP | 2006-501109 | 1/2006 | |
| NZ | 240448 | 10/1995 | |
| NZ | 296014 | 10/1998 | |
| NZ | 335565 | 10/1999 | |
| NZ | 506684 | 8/2000 | |
| NZ | 512423 | 6/2001 | |
| NZ | 521694 | 10/2003 | |
| RU | 2021956 | 10/1994 | |
| RU | 2096288 | 11/1997 | |
| WO | WO93/09031 | 5/1993 | |
| WO | WO1993/012975 | 7/1993 | |
| WO | WO9405555 | 3/1994 | |
| WO | WO9703885 | 2/1997 | |
| WO | WO97/014617 | 4/1997 | |
| WO | WO1997/034808 | 9/1997 | |
| WO | WO1999/021770 | 5/1999 | |
| WO | WO2001040081 | 12/1999 | |
| WO | WO2000/051895 | 9/2000 | |
| WO | WO2002/002418 | 1/2002 | |
| WO | WO2002/018213 | 3/2002 | |
| WO | WO2002/085755 | 10/2002 | |
| WO | WO2004/0028910 | 4/2004 | |
| WO | WO2004/106175 | 12/2004 | |
| WO | WO2004/106176 | 12/2004 | |
| WO | WO2005/012091 | 2/2005 | |
| WO | WO2006/113428 | 10/2006 | |
| WO | WO2007/127337 | 11/2007 | |

OTHER PUBLICATIONS

U.S. Appl. No. 12/244,041, US File History, now U.S. Pat. No. 8,839,972.
U.S. Appl. No. 12/250,756, US File History, now U.S. Pat. No. 8,529,975.
U.S. Appl. No. 12/250,856, US File History, now U.S. Pat. No. 8,381,496.
U.S. Appl. No. 12/964,127, US File History, now U.S. Pat. No. 8,726,616.
U.S. Appl. No. 13/038,986, US File History.
U.S. Appl. No. 13/365,256, US File History.
U.S. Appl. No. 13/415,831, US File History.
U.S. Appl. No. 13/476,997, US File History.
U.S. Appl. No. 13/615,555, US File History.
U.S. Appl. No. 15/074,791, US File History (not yet published).

* cited by examiner

FIG 8
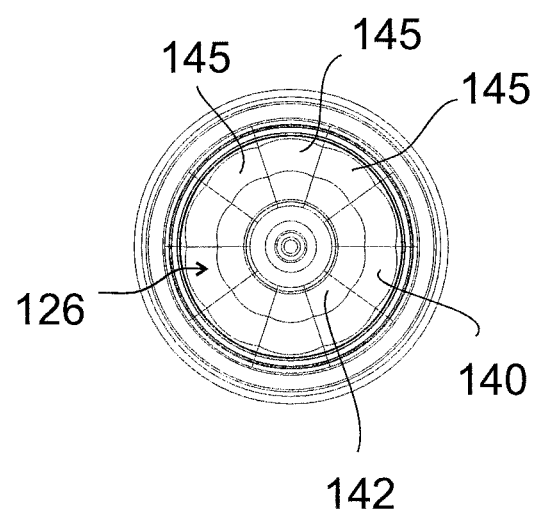
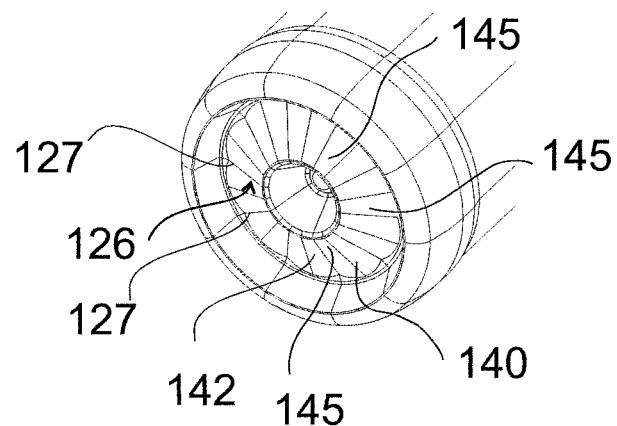
FIG 7

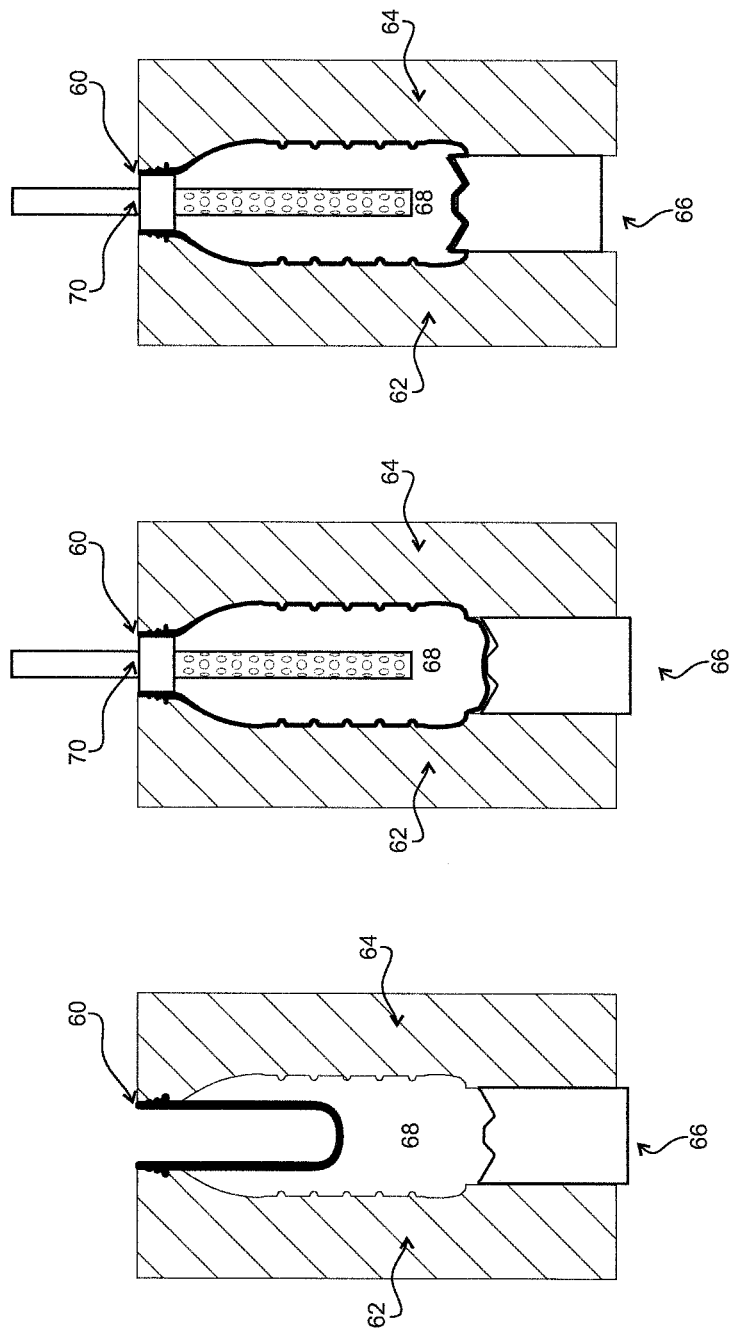

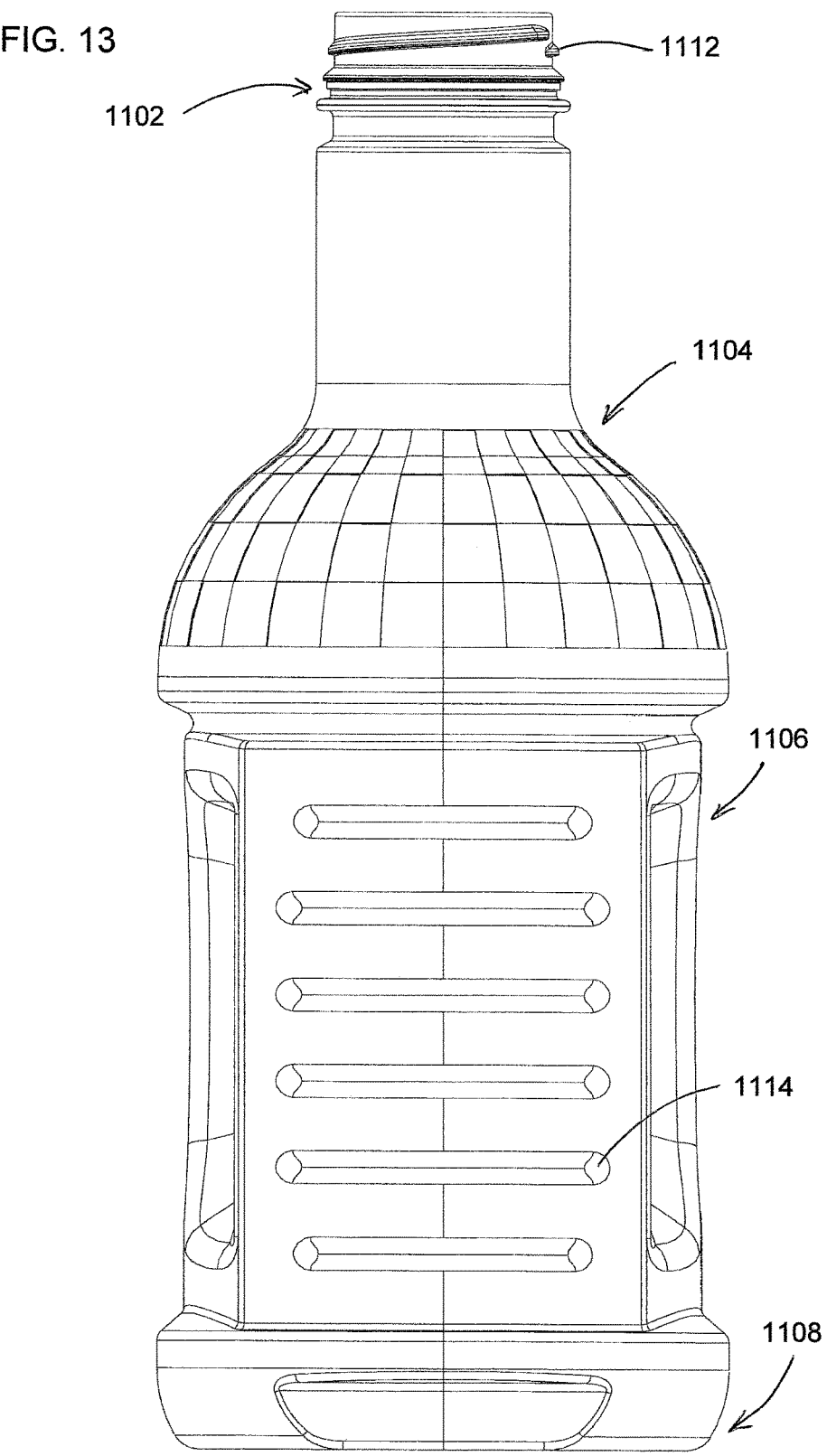

SYSTEMS AND METHODS FOR HANDLING PLASTIC CONTAINERS HAVING A DEEP-SET INVERTIBLE BASE

CROSS-REFERENCE TO RELATED APPLICATIONS

The present application is a continuation of U.S. patent application Ser. No. 13/476,997 filed May 21, 2012 (the '997 application), abandoned.

The '997 application is a continuation-in-part of U.S. patent application Ser. No. 13/415,831 (the '831 application), filed Mar. 8, 2012, now U.S. Pat. No. 9,731,884 issued Aug. 15, 2017.

The '831 application is a continuation-in-part of U.S. patent application Ser. No. 11/704,368 (the '368 application and published as US2008/0047964), filed Feb. 9, 2007, now U.S. Pat. No. 8,584,879 issued Nov. 19, 2013. The '368 application is a continuation-in-part of U.S. patent application Ser. No. 10/529,198, filed on Dec. 15, 2005, now U.S. Pat. No. 8,152,010, issued Apr. 10, 2012, which is the U.S. National Phase of International Application No. PCT/NZ2003/000220, filed on Sep. 30, 2003, which claims priority of New Zealand Application No. 521694, filed on Sep. 30, 2002.

The '831 application is also a continuation-in-part of U.S. patent application Ser. No. 13/412,572, filed Mar. 5, 2012, now U.S. Pat. No. 9,145,223 issued Sep. 29, 2015, which is a continuation of co-pending U.S. patent application Ser. No. 11/704,338 (the '338 application and published as US20070199915), filed Feb. 9, 2007, now U.S. Pat. No. 8,127,955, issued Mar. 6, 2012. The '338 application is a continuation-in-part of co-pending U.S. patent application Ser. No. 10/529,198, filed Dec. 15, 2005, now U.S. Pat. No. 8,152,010, issued Apr. 10, 2012, which is a 371 application of International Application No. PCT/NZ2003/000220, filed Sep. 30, 2003, which in turn claims priority of New Zealand Patent Application No. 521694, filed Sep. 30, 2002.

The '831 application is also a continuation-in-part of U.S. patent application Ser. No. 11/413,124 filed Apr. 28, 2006 (the '124 application and published as US2006/0255005), now U.S. Pat. No. 8,381,940, issued Feb. 26, 2013. The '124 application is also a continuation-in-part of U.S. patent application Ser. No. 10/529,198, filed on Dec. 15, 2005, now U.S. Pat. No. 8,152,010, issued Apr. 10, 2012, which is the U.S. National Phase of International Application No. PCT/NZ2003/000220, filed on Sep. 30, 2003, which claims priority of New Zealand Application No. 521694, filed on Sep. 30, 2002.

The contents and disclosures of each of the aforementioned applications, their publications and patents are incorporated herein by reference thereto.

BACKGROUND OF THE INVENTION

1. Field of the Invention

The present invention relates generally to a hot-fill container structure that allows for the removal of vacuum pressure within the container, and more particularly, to a hot-fill container structure having an invertible vacuum panel deeply set into the base of the container. The present invention also relates to methods of making and processing containers having an invertible vacuum panel deeply set into the base of the container.

2. Related Art

So called "hot-fill" containers are known in the art. Plastic containers, such as PET containers, are filled with various liquid contents at an elevated temperature, typically around 185.degree. F. Once the liquid within the container cools, the volume of the contained liquid reduces, creating a vacuum within the container that pulls inwardly on the side and end walls of the container. This in turn leads to deformation of the plastic container if it is not constructed rigidly enough to resist the vacuum forces.

Typically, vacuum pressures have been accommodated by the use of vacuum panels that deflect inwardly under vacuum pressure. Known vacuum panels are typically located in the container sidewall and extend parallel to the longitudinal axis of the container, and flex inwardly under vacuum pressure toward the longitudinal axis.

It is also known in the prior art to have a flexible base region to provide additional vacuum compensation. All such known prior art containers, however, have substantially flat or inwardly recessed base surfaces that deflect further inward to compensate for the vacuum forces. Known flexible base regions have not been able to adequately compensate for the vacuum forces on their own (i.e., vacuum panels in the sidewall and/or or other reinforcing structures are still required).

Therefore, there remains a need in the art for plastic containers that overcome the aforementioned shortcomings of the prior art.

BRIEF SUMMARY OF THE INVENTION

The present invention relates to a plastic container having an invertible pressure panel located in the container base. The pressure panel is movable from an initial, outwardly-inclined position, to an inverted, inwardly-inclined position, in order to reduce the volume of the container and accommodate for vacuum forces within the container. The entire pressure panel is set deeply into the base of the container, such that no portion of the pressure panel extends beyond the standing ring, regardless of whether the pressure panel is in the initial position or the inverted position. This configuration can allow the container to be supported by the standing ring regardless of whether the pressure panel is in the initial position or the inverted position.

According to one exemplary embodiment, the present invention relates to a plastic container comprising an upper portion including a finish defining an opening into the container, a lower portion including a base defining a standing surface, a sidewall extending between the upper portion and the lower portion, the sidewall defining a longitudinal axis, and at least one substantially transversely-oriented pressure panel located in the lower portion. The pressure panel can be movable between an outwardly-inclined position and an inwardly-inclined position to compensate for a change of pressure inside the container. The standing surface can define a standing plane, and the entire pressure panel can be located between the standing plane and the upper portion of the container when the pressure panel is in the outwardly-inclined position.

According to another exemplary embodiment, the present invention relates to a method of processing a plastic container, comprising the steps of (a) providing a plastic container having an upper portion including a finish, a sidewall, a lower portion including a base defining a standing surface, and a substantially transversely-oriented pressure panel located in the base; (b) introducing heated liquid contents into the plastic container with the pressure panel located in an outwardly-inclined position entirely between the standing surface and the upper portion; (c) capping the plastic container; and (d) moving the pressure panel to an inwardly-inclined position entirely between the standing surface and the upper portion.

According to yet another exemplary embodiment, the present invention relates to a method of blow molding a plastic container, comprising the steps of (a) enclosing a softened polymer material within a blow mold defining a mold cavity, the blow mold comprising at least first and second side mold portions and a base mold portion; (b) inflating the polymer material within the blow mold to at least partially conform the polymer material to the blow mold cavity; and (c) displacing the base mold portion with respect to the first and second side mold portions to form a transverse pressure panel deeply set within a base portion of the plastic container.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

FIG. 7 is a perspective view of a portion of a plastic container according to yet another exemplary embodiment of the present invention, shown with the pressure panel in an initial, outwardly-inclined position;

FIG. 8 is a bottom view of the plastic container of FIG. 7;

FIGS. 12A-C schematically illustrate an exemplary method of forming a plastic container according to the present invention.

FIG. 13 is a side elevation view of a further exemplary embodiment of a plastic container according to the present inventions.

DETAILED DESCRIPTION OF THE INVENTION

Figure 1:
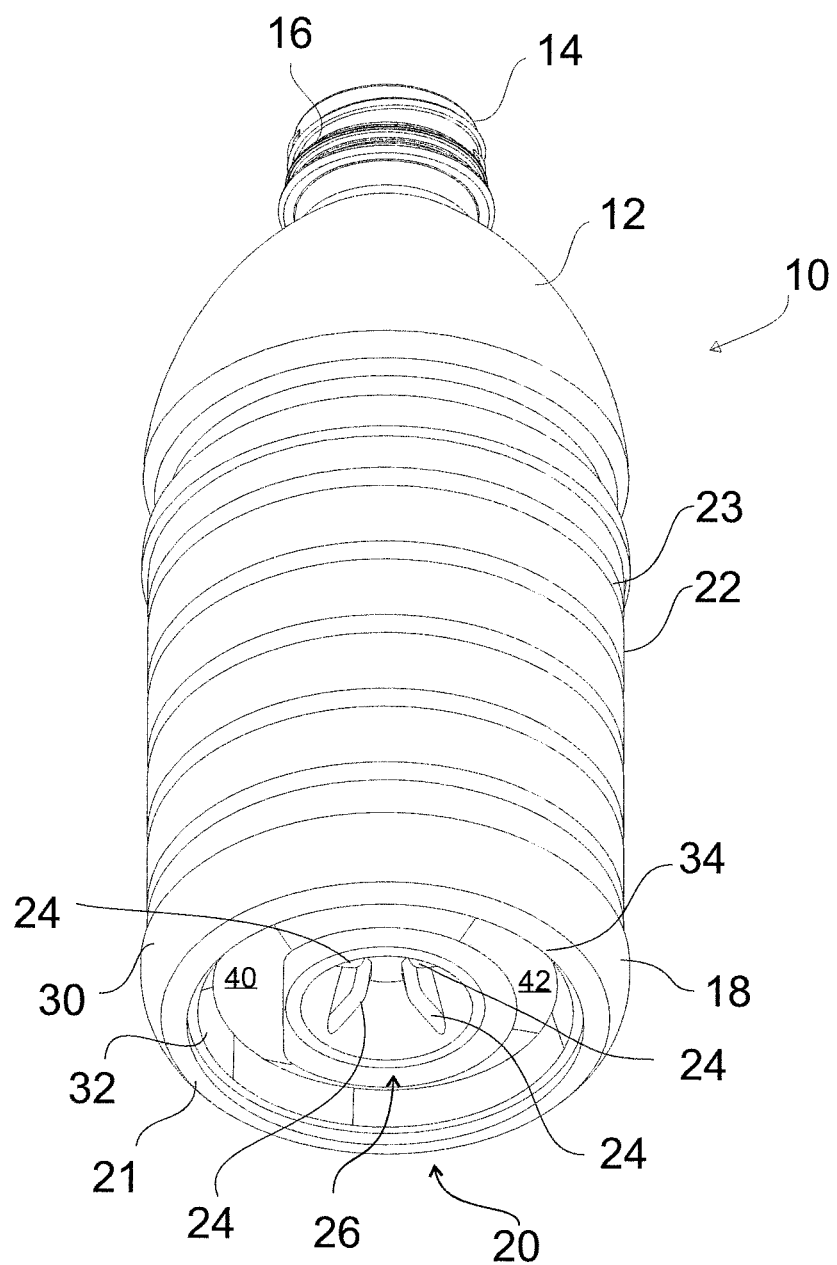
FIG. 1 is a perspective view of an exemplary embodiment of a plastic container according to the present invention, shown with a pressure panel in an initial, outwardly-inclined position.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without departing from the spirit and scope of the invention. All references cited herein are incorporated by reference as if each had been individually incorporated.

As discussed above, to accommodate vacuum forces during cooling of the liquid contents within a hot-fill container, plastic containers have typically included a series of vacuum panels located around the sidewall and/or in the base portion. The vacuum panels deform inwardly, and the base deforms upwardly, under the influence of the vacuum forces. This configuration attempts to prevent unwanted distortion elsewhere in the container. However, the container is still subjected to internal vacuum forces. The sidewalls and base merely provide a suitably resistant structure against that force. Additionally, the vacuum panels in the sidewall can undesirably detract from the appearance and feel of the container, and limit the design possibilities for the container.

Typically at a bottling plant, the containers are filled with a hot liquid and then capped before being subjected to a cold water spray, resulting in the formation of a vacuum within the container. The container structure needs to be able to cope with this vacuum force. U.S. patent application Ser. No. 10/529,198, filed on Dec. 15, 2005, the entire content of which is incorporated herein by reference, discloses hot-fill containers that provide for the substantial removal or substantial negation of the vacuum pressure within the containers. The disclosed containers include a transversely-oriented pressure panel located in the container base. The pressure panel is movable between an initial, outwardly inclined position, and an inverted, inwardly inclined position, in order to reduce the volume of the container and accommodate for vacuum forces within the container. The present invention relates to additional embodiments of this concept in which the pressure panel is set deeply into the base of the container, such that no portion of the pressure panel extends beyond the standing ring, regardless of whether the pressure panel is in the initial position or in the inverted position. This configuration can allow the container to be supported by the standing ring regardless of whether the pressure panel is in the initial position or the inverted position.

Referring to FIGS. 1-4, an exemplary embodiment of a plastic container 10 according to the present invention is shown. The container 10 can include an upper portion 12 including a finish 14 that defines an opening into the interior of the container 10. As shown, the finish 14 can include threads 16 or other structures adapted to secure a closure (not shown) onto the container 10. The container 10 can also include a lower portion 18 having a base 20, and a sidewall 22 extending between the upper portion 12 and the lower portion 18. The base 20 can define a standing surface 21 that is substantially flat and adapted to support the container 10 in a substantially upright position (e.g., with longitudinal axis A substantially perpendicular to the surface on which container 10 is resting).

In the exemplary embodiment shown, the sidewall 22 is substantially tubular and has a substantially circular transverse cross-sectional shape. Alternative cross-sectional shapes can include, for example, an oval transverse cross-section; a substantially square transverse cross-section; other substantially polygonal transverse cross-sectional shapes such as triangular, pentagonal, etc.; or combinations of curved and arced shapes with linear shapes. As will be understood by one of ordinary skill in the art, when the container 10 has a substantially polygonal transverse cross-sectional shape, the corners of the polygon are typically rounded or chamfered. Although the container 10 is shown as having reinforcing rings 23 in the sidewall 22, other embodiments are possible where the sidewall 22 is substantially devoid of such features (e.g., the sidewall 22 can be smooth like that of a conventional glass container).

Figure 4:
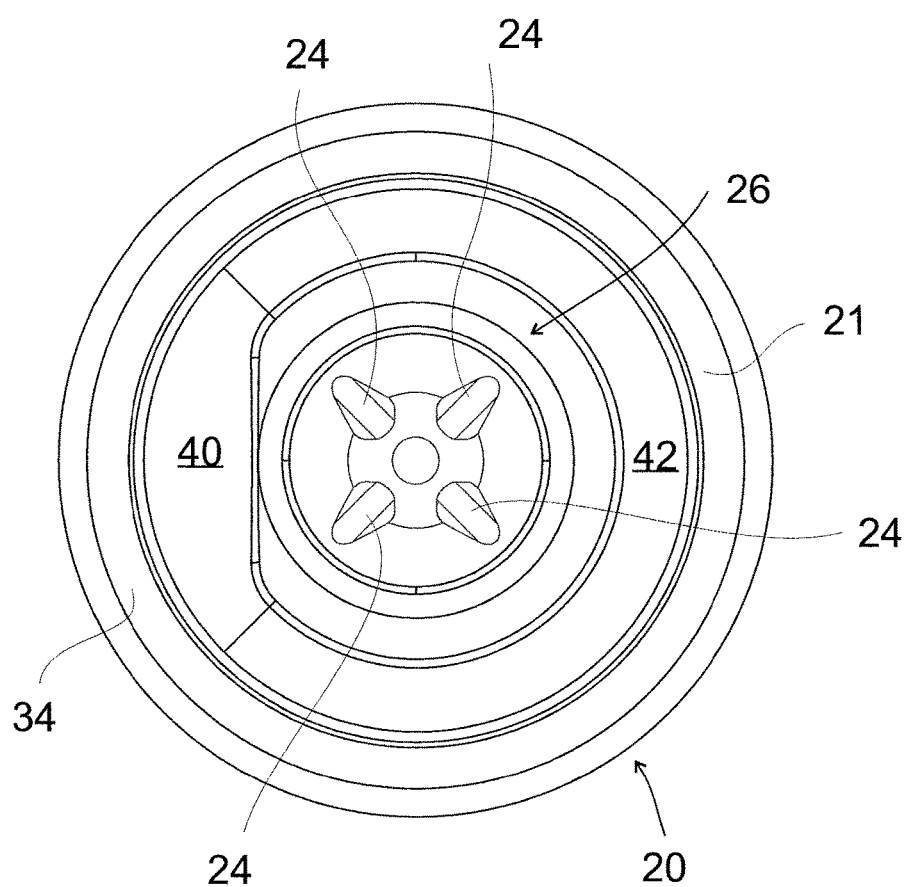
FIG. 4 is a bottom view of the plastic container of FIG. 1.

As best seen in FIG. 4, a portion of the base 20 can include a plurality of reinforcing ribs 24, however other embodiments with or without the reinforcing ribs 24 are possible.

The lower portion 18 of the container 10, and particularly the base 20, can include a substantially transversely-oriented pressure panel 26. The pressure panel 26 can be moved between an outwardly-inclined position (shown in FIGS. 1 and 2) and an inwardly-inclined position (shown in FIG. 3) in order to reduce the internal volume of the container 10 and compensate for any vacuum forces created within the container, for example, during the filling process. For example, the pressure panel 26 may substantially remove the internal vacuum that develops within the container 10 during a hot-fill process once the container 10 has been hot-filled, capped, and cooled.

Figure 2:
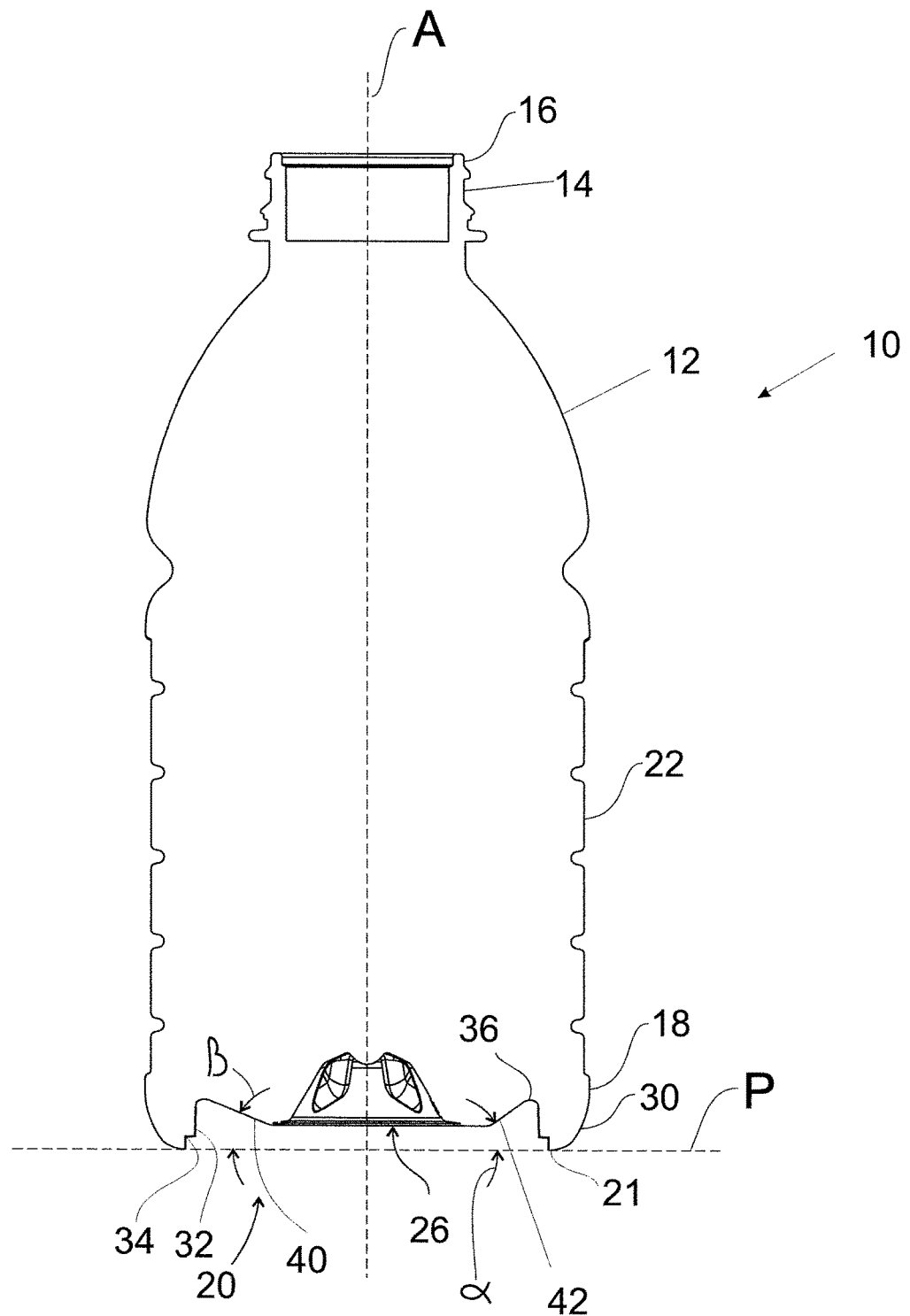
FIG. 2 is a side, sectional view of the plastic container of FIG. 1, shown with the pressure panel in the initial, outwardly-inclined position.
Figure 3:
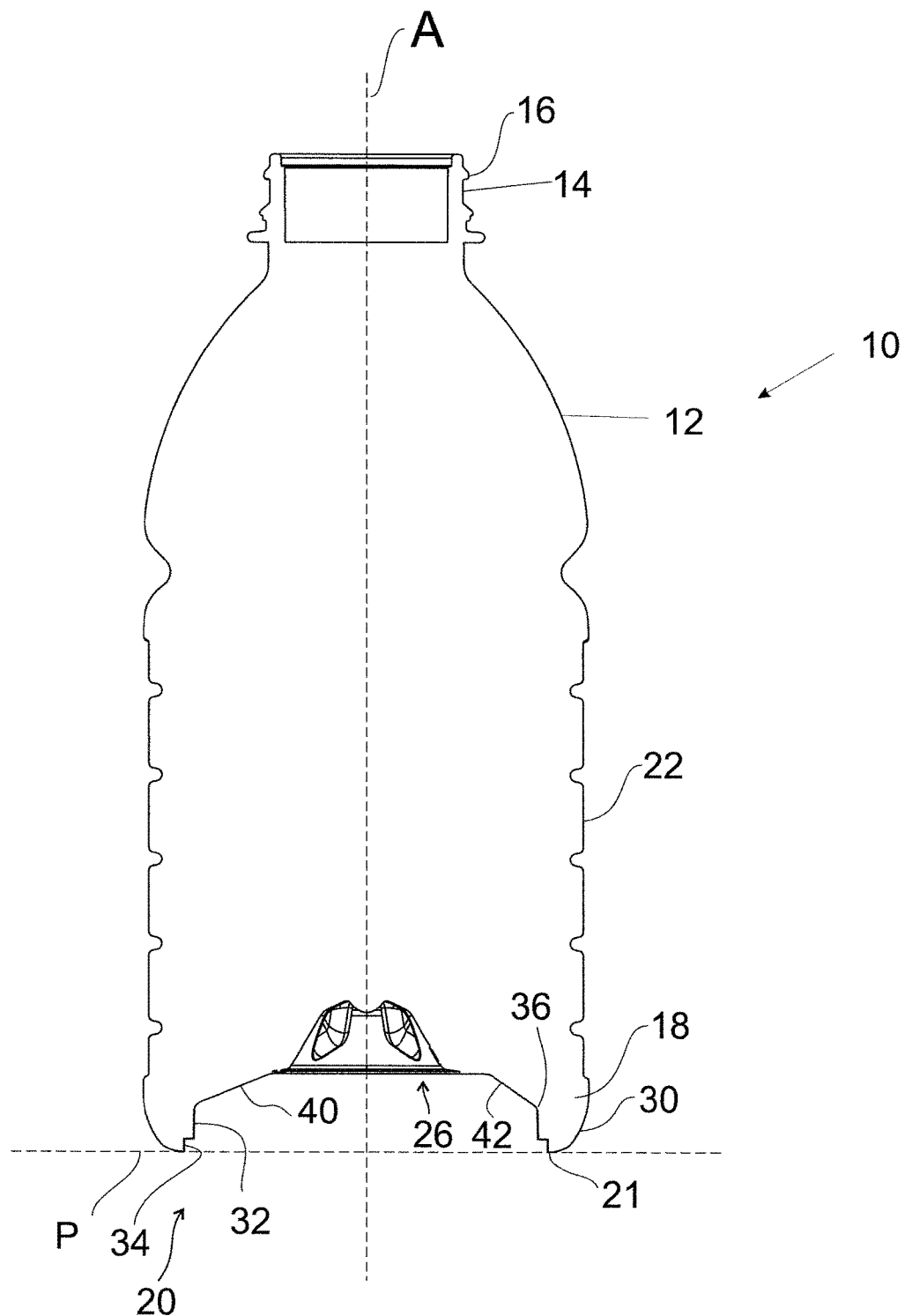
FIG. 3 is a side, sectional view of the plastic container of FIG. 1, shown with the pressure panel in an inverted, inwardly-inclined position.

As best seen in the sectional views of FIGS. 2 and 3, the pressure panel 26 can be deeply set into the container 10 in order to facilitate standing of the container 10 on its standing surface 21 regardless of whether the pressure panel 26 is located in the outwardly-inclined position (FIG. 2) or the inwardly-inclined position (FIG. 3). In other words, the entire pressure panel 26 structure can be located between the plane P of the standing surface 21 and the upper portion 12 of the container 10 when the pressure panel 26 is in the outwardly-inclined position (FIG. 2) and also when the pressure panel 26 is in the inwardly-inclined position (FIG. 3).

According to the exemplary embodiment shown in FIGS. 1-4, the lower portion 18 of the container 10 includes a concave outer wall portion 30 that extends from the lower end of the sidewall 22 to the standing surface 21. The pressure panel 26 is deeply set into the lower portion 18 of the container 10 via an inner wall 32 that extends from the standing surface 21 to the pressure panel 26. In the exemplary embodiment shown, the inner wall 32 is parallel or nearly parallel to the longitudinal axis A of the container 10, however, other configurations and/or inclinations of the inner wall 32 are possible. In addition, one of ordinary skill in the art will know that other configurations besides the inner wall 32 may be implemented to set the pressure panel 26 deeply into the lower portion 18. An annular, recessed channel 34 can be provided in or adjacent the standing surface 21. In the exemplary embodiment shown, the recessed channel has a substantially square cross-section, however, other shapes are possible. Channel 34 can reinforce the standing surface 21 and/or facilitate stacking of multiple containers on top of one another, depending on the shape and size of the finish 14 and/or closure.

Figure 5:
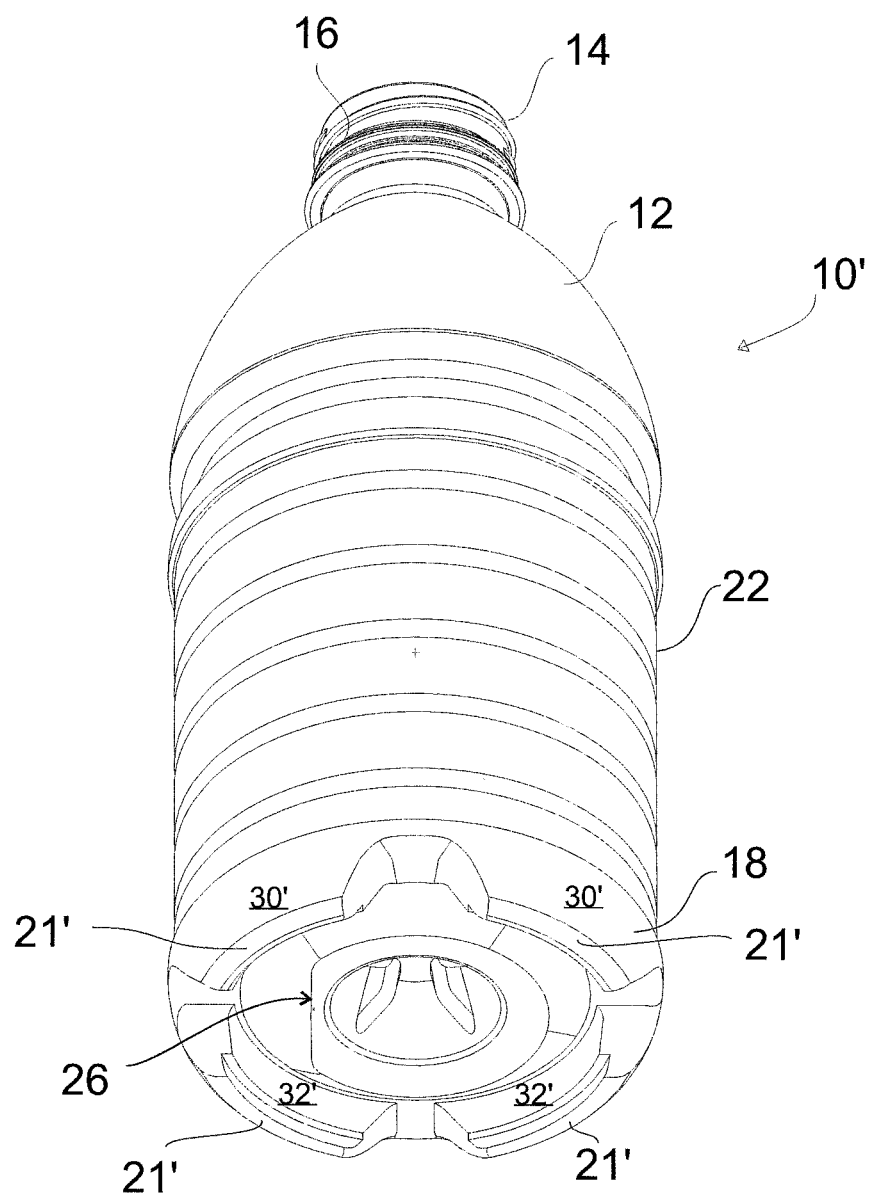
FIG. 5 is a perspective view of another exemplary embodiment of a plastic container according to the present invention, shown with the pressure panel in the initial, outwardly-inclined position.

In the exemplary embodiment of FIGS. 1-4, the standing surface 21, inner wall 32, and outer wall 30 are substantially continuous about the circumference of the container 10 (see FIG. 4). However, as shown in the alternative embodiment of FIGS. 5 and 6, the container 10' can have a standing surface 21', inner wall 32', and outer wall 30' that are discontinuous.

In order to facilitate movement (e.g., folding) of the pressure panel 26 between the outwardly-inclined position of FIG. 2 and the inwardly-inclined position of FIG. 3, pressure panel 26 can include a decoupling or hinge structure 36 that is located between the inner wall 32 and the pressure panel 26. In the exemplary embodiment shown, the hinge structure 36 comprises a substantially flat, non-ribbed region, that is susceptible to folding, however, other configurations of the hinge structure, such as a crease, are possible.

Referring now particularly to FIG. 4, the pressure panel 26 can comprise an initiator portion 40 and a control portion 42. Both the initiator portion 40 and control portion 42 can comprise part of the pressure panel 26 that folds when the pressure panel 26 is moved from its initial position in FIG. 2 to its inverted position in FIG. 3. The initiator portion 40 can be adapted to move or fold before the rest of the pressure panel 26 (e.g., before the control portion 42). In the exemplary embodiment shown, the control portion 42 is at a steeper angle to the standing plane P than the initiator portion 40, thereby resisting expansion of the pressure panel from the inverted state (FIG. 3) to the initial state (FIG. 2), for example, if the container 10 were accidentally dropped.

In order to maximize the amount of vacuum compensation from the pressure panel 26, it is preferable for at least the control portion 42 to have a steep angle of inclination with respect to the standing plane P. As shown in FIG. 2, the control portion 42 can be at a first angle .alpha. with respect to the standing plane P. According to one exemplary embodiment, the first angle .alpha. can be at least 10 degrees, and preferably is between about 30 degrees and about 45 degrees. According to this embodiment, the initiator portion 1 can be at a second angle .beta. with respect to standing plane P, that is at least 10 degrees less than the first angle .alpha.

When the pressure panel is inverted from the outward state (FIG. 2) to the inward state (FIG. 3), it can undergo an angular change that is approximately equal to its angle of inclination. For example, if the control portion 42 is initially set at an angle .alpha. of about 10 degrees, it will provide an angular change of approximately 20 degrees. At such a low angle of inclination, however, it can be difficult to provide an adequate amount of vacuum compensation in a hot-filled container. Therefore it is preferable to provide the initiator portion 40 and control portion 42 with steeper angles. For example, with the control portion set at an angle .alpha. of about 35 degrees, the pressure panel 26 will undergo an angular change of about 70 degrees upon inversion. According to this exemplary embodiment, the initiator portion 40 can be set at an angle .beta. of about 20 degrees.

Referring to FIGS. 7-10, a base portion of a container according to an alternative embodiment is shown, wherein the control portion of the pressure panel comprises a substantially continuous conical area extending around the base. According to this embodiment, the initiator portion 140 and the control portion 142 are set at a common angle, such that they form a substantially uniform pressure panel 126. However, initiator portion 140 may still be configured to provide the least amount of resistance to inversion of pressure panel 126, such that it still provides an initial area of folding or inversion. For example, the initiator portion 140 may have a smaller material thickness than the control portion 142. According to the embodiment shown in FIGS. 7-10, initiator portion 140 causes the pressure panel 126 to begin inversion at its region of widest diameter, near the hinge structure 136.

Figure 6:
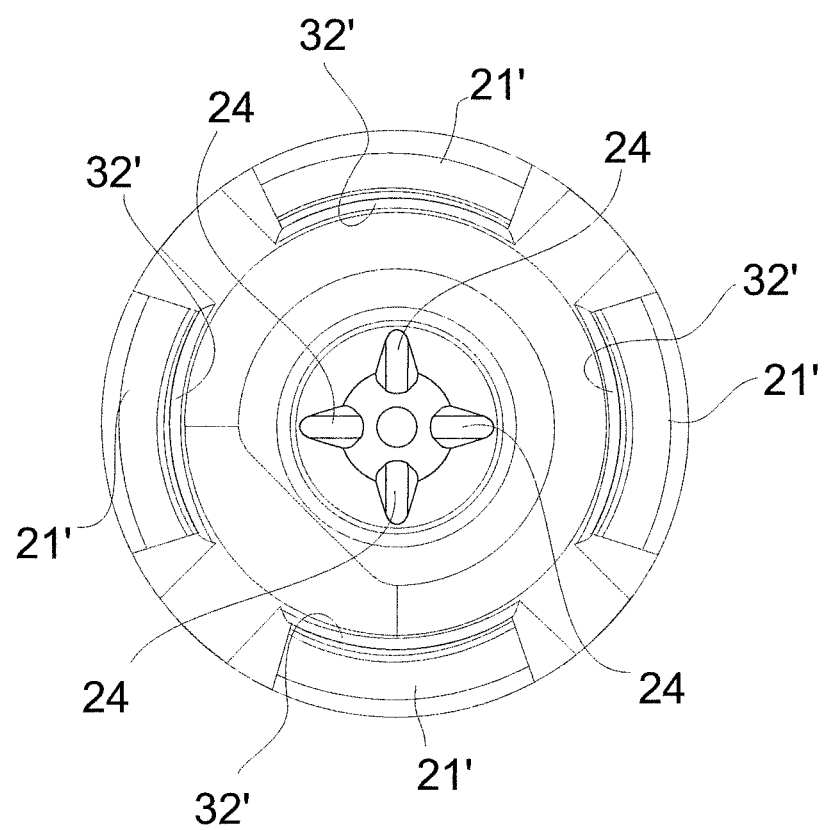
FIG. 6 is a bottom view of the plastic container of FIG. 5.
Figure 9:
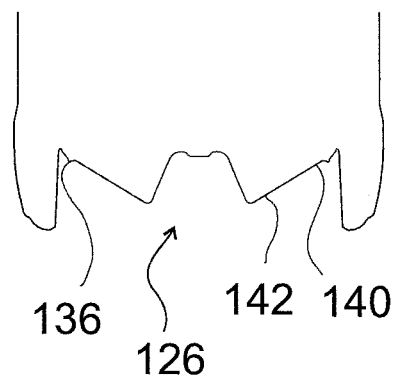
FIG. 9 is a side, sectional view of a portion of the plastic container of FIG. 7, shown with the pressure panel in the initial, outwardly-inclined position.
Figure 10:
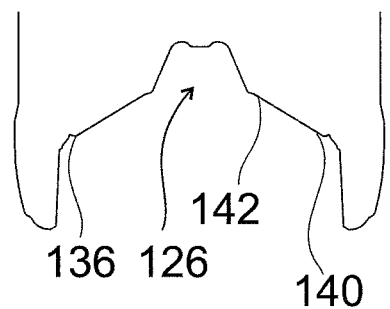
FIG. 10 is a side, sectional view of a portion of the plastic container of FIG. 7, shown with the pressure panel in the inverted, inwardly-inclined position.

Additional structures may be added to the pressure panel 126 in order to add further control over the inversion process. For example, the pressure panel 126 may be divided into fluted regions, as shown in FIGS. 6 and 7. As shown, the fluted regions 145 can be outwardly convex, and evenly distributed around the container's longitudinal axis to create alternating regions of greater and lesser angular inclination. This type of geometry can provide increased resistance against the panel returning from the inward position (FIG. 10) to the outward position (FIG. 9), for example, if the container were dropped. The fluted configuration can also provide more even distribution of forces on the pressure panel 126. According to an alternative embodiment, the flutes can be inwardly concave. Inwardly directed flutes offer less resistance to initial inverting forces, coupled with increased resistance to reverting back to the original, outward position. Further details regarding the pressure panel and fluting are disclosed in co-pending U.S. patent application Ser. No. 10/529,198, filed on Dec. 15, 2005, the entire content of which is incorporated herein by reference.

Figure 14:
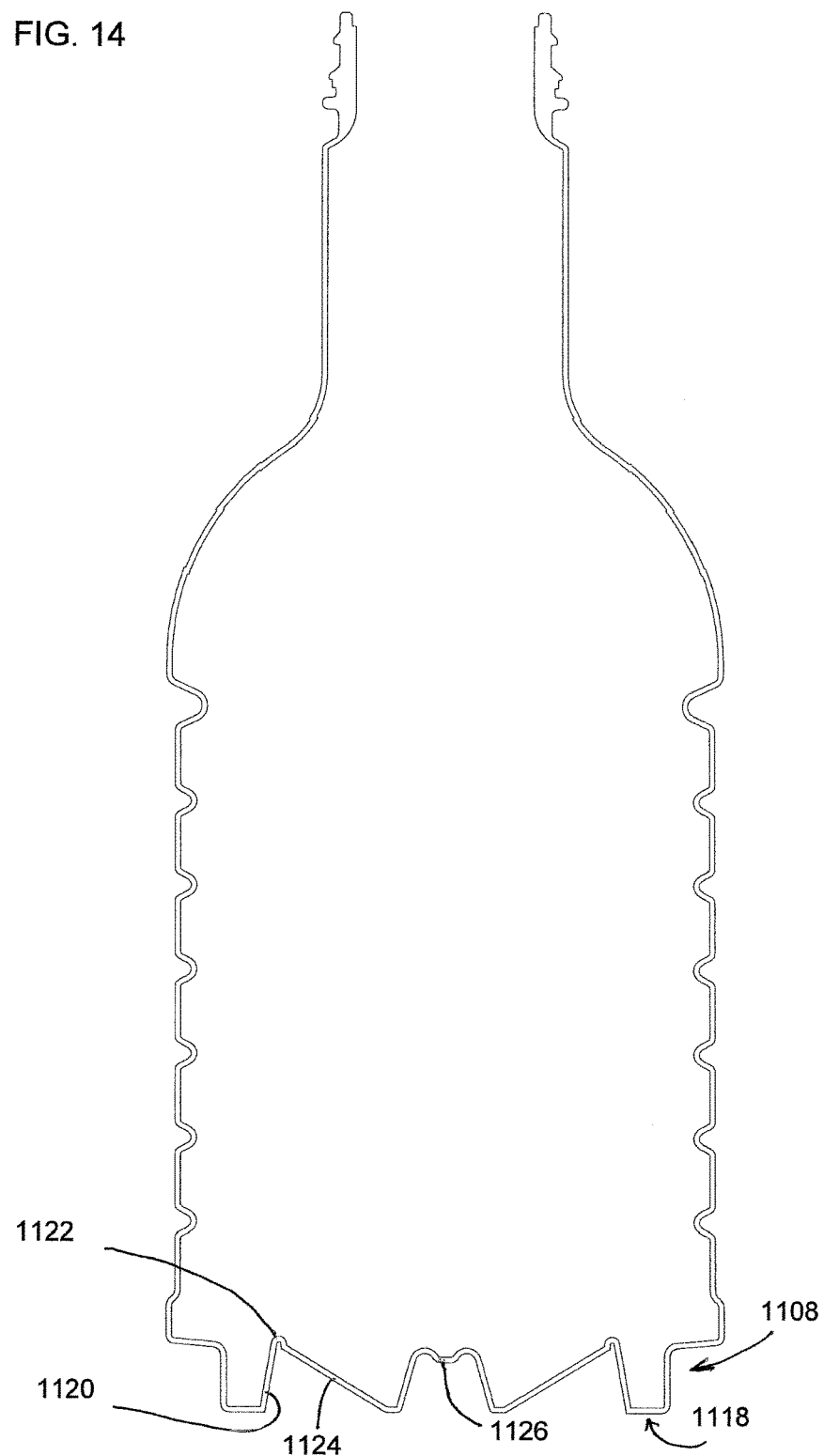
FIG. 14 is a side sectional view of the container of FIG. 13.
Figure 15:
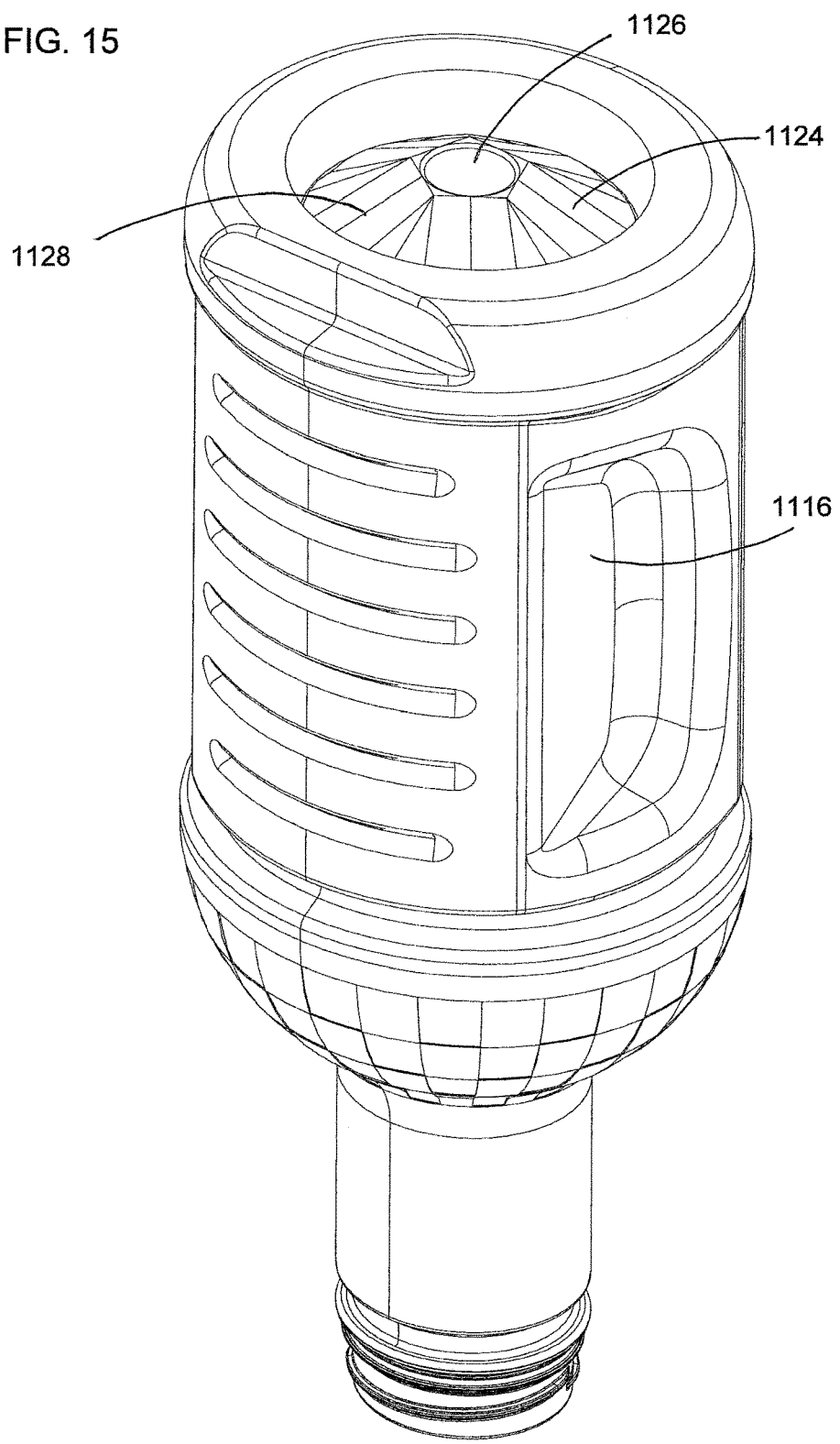
FIG. 15 is a lower isometric view of the container of FIG. 13.

FIGS. 13 to 15 show another exemplary embodiment of a container that can be used as described herein. The container includes an upper portion 1102, shoulder 1104, body 1106 and base 1108. The upper portion 1102 includes an opening into the container which may be closed and sealed, such as via a screw cap using thread 1112.

The container body 1106 in the present example includes ribs 1114 in a first region thereof and panels 1116 in second portions thereof. Panels 1116 in this example act as vacuum panels as discussed below and also facilitate gripping of the container by a consumer, but in other examples may be configured to serve only as grip panels and not pressure panels. In another example, vacuum panels may be placed in the container body separately from the grips or without the grips.

The container base 1108 includes standing ring or bearing surface 1118 on which the container rests when in an upright position. Adjacent the standing ring 1118 is a recess or instep forming a first wall 1120 which joins pressure panel or second wall 1124 via a hinge structure 1122. An inwardly projecting push-up or section 1126 is provided in the center of the base 1108. The panel or second wall 1124 may include creases 1128 as shown which aid control over the configuration of the panel or second wall 1124 as it moves between outwardly and inwardly inclined positions.

The container of FIGS. 13 to 15 is particularly adapted to hot-fill applications but may be used in other applications where there are changes in pressure inside the container.

According to one hot-filling method using the container of FIGS. 13-15, the container is provided to a filling station with the second wall 1124 configured as shown in FIGS. 14 and 15. The container is then filled with hot or heated liquid and sealed, for example, using a screw cap. As the container cools, contents of the container (particularly the headspace), contract. This causes the pressure in the container to drop. Cooling may be accelerated, for example, by spraying the outside of the container with water.

To prevent unwanted deformation of the container caused by the reduction in internal pressure, one or both pressure panels 1116, 1124 are configured to move inwards to reduce the container volume and increase the internal pressure of the container. In one example, at least the panels 1116 provided in the container sidewall are adapted to move inwards through action of the vacuum force generated inside the container during cooling, and in another example the panel 1124 is adapted to move inward through action of the vacuum force generated inside the container during cooling. In a third example, both move inward, and in a further example, the container sidewalls are subjected to vacuum force prior to the base.

In the present example, panel 1124 is also configured to move to adjust the container volume. More particularly, panel 1124 is configured to invert about hinge structure 1122 from being outwardly inclined as shown in FIGS. 14 and 15 to being inwardly inclined (not shown).

Inversion of the panel 1124 may be initiated by engagement of a pusher or other external mechanical force against the base 1108, preferably the centrally located push-up 1126 of the base 1108. Additionally or alternatively, the panel 1124 may include an initiator portion that is configured to initiate or cause the rest of the panel to move between the outwardly and inwardly inclined positions. The initiator portion may reduce or obviate the need for a pusher, providing for movement of the panel 1124 due to the forces generated by the pressure differential between the inside and outside of the container. To this end, the initiator portion may have a lower angle of inclination than other portions of the panel 1124 relative to the standing plane formed by the standing ring 1118.

According to preferred embodiments, opposing vacuum panels 1116 are subjected to vacuum force prior to repositioning of the base. More preferably, the vacuum panels 1116 move inwards prior to movement of the second wall or panel 1124 to the inwardly inclined position. Other methods of using containers as described herein can also be used with the container of FIGS. 13-15.

It will be noted that the instep or first wall 1120 is configured so as to elevate the panel 1124 and other portions of the base 1108 above the standing ring 1118 when the panel 1124 is outwardly inclined. Such a configuration provides improved container stability during the filling operations. However, the instep or first wall 1120 may be recessed to a lesser extent such that a portion of the base extends below the standing ring 1118 when the panel 1124 is outwardly inclined. As will be appreciated, this will mean that different portions of the container base 1108 act as the standing ring depending on whether the panel or second wall 1124 is inwardly or outwardly inclined.

The container shown in FIGS. 13 to 15 may also be used in pasteurisation processes. According to an example such process, the container is filled with the panel 1116, 1124 in the inward position and then sealed. The container and its contents are then heated, causing an increase in internal pressure. As a result of this the panels 1116, 1124 move to an outward position. After the heating stage of the pasteurisation process is completed and the container is cooled, the panels 1116, 1124 preferably revert to the inwardly inclined position.

According to preferred embodiments, different stages of the filling and/or pasteurisation processes may be performed at different stations within a filling or processing facility. To this end, the container may be conveyed in between stages or during a particular stage depending on system requirements and preferences.

Figure 16:
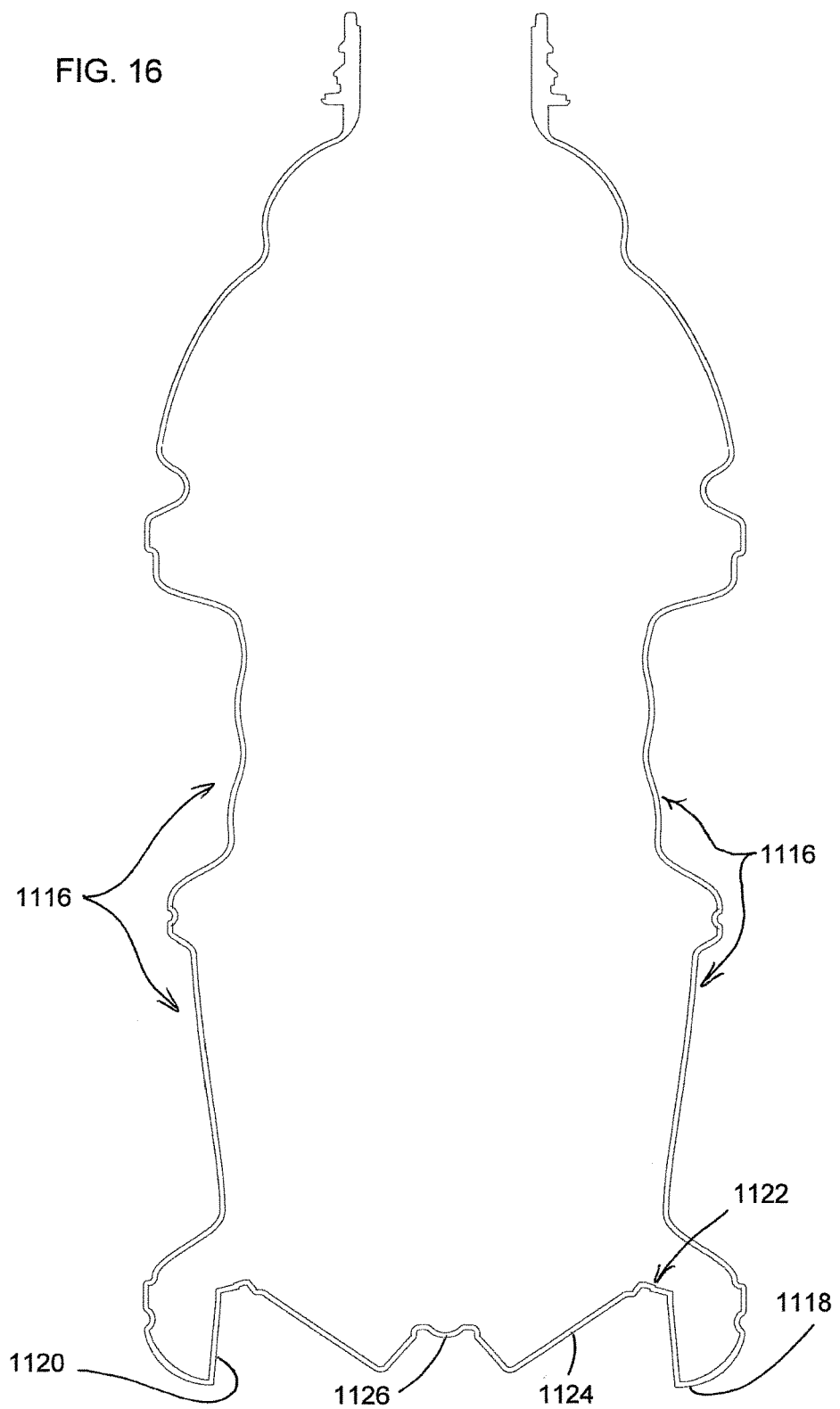
FIG. 16 is a side sectional view of a further exemplary embodiment of a plastic container according to the present inventions.
Figure 17:
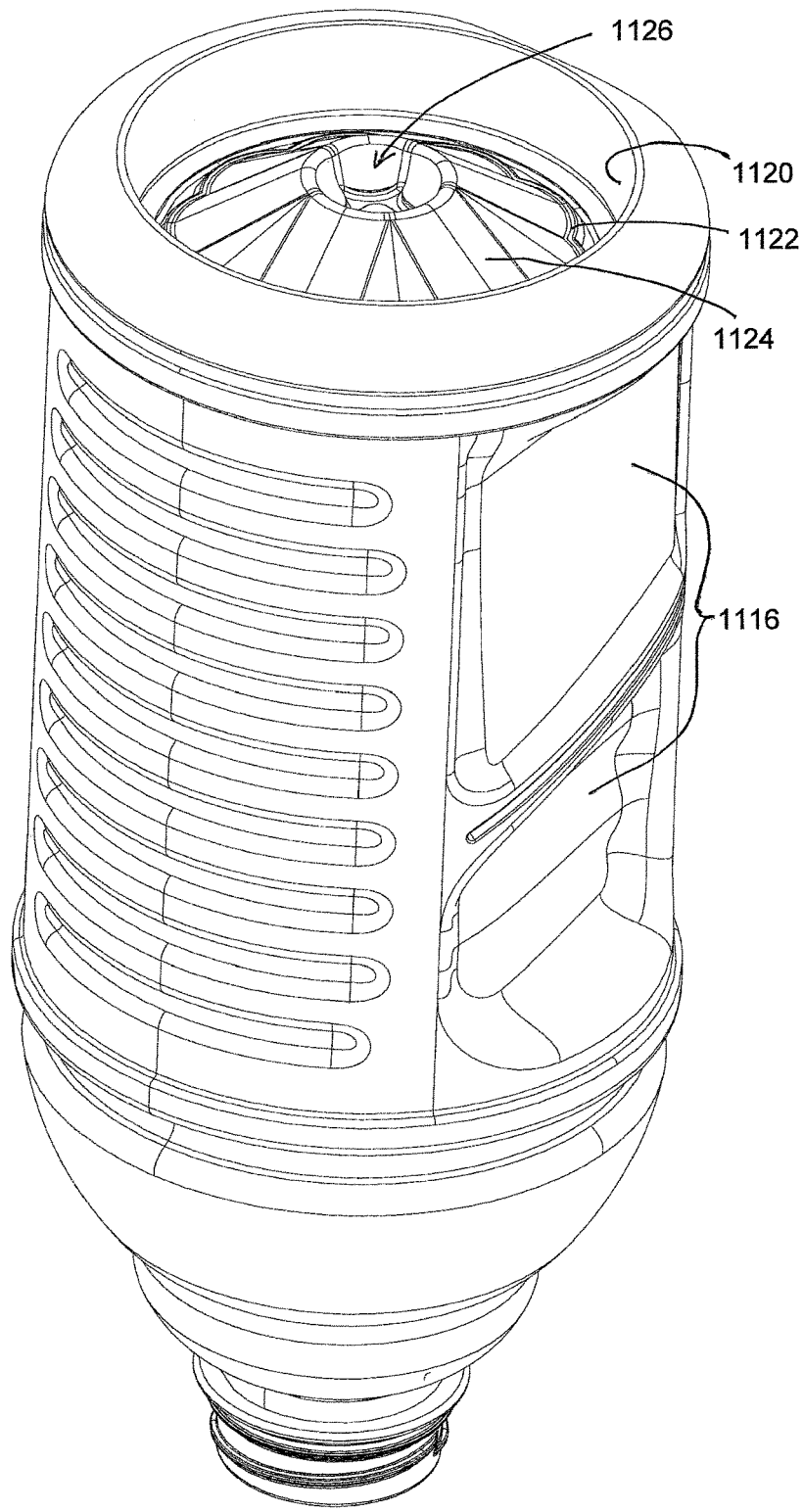
FIG. 17 is a lower isometric view of the container of FIG. 16.

FIGS. 16 and 17 show a container according to another embodiment. Many of the features of this embodiment are the same or substantially the same as those of the embodiment of FIGS. 13 to 15 and like references have been used to aid clarity. Only features that differ from the embodiment of FIGS. 13 to 15 will be described.

As shown in FIGS. 16 and 17, the container of this embodiment includes first and second panels 1116 on two opposing faces of the sidewall thereof, at least one of which is a vacuum panel.

Figure 18:
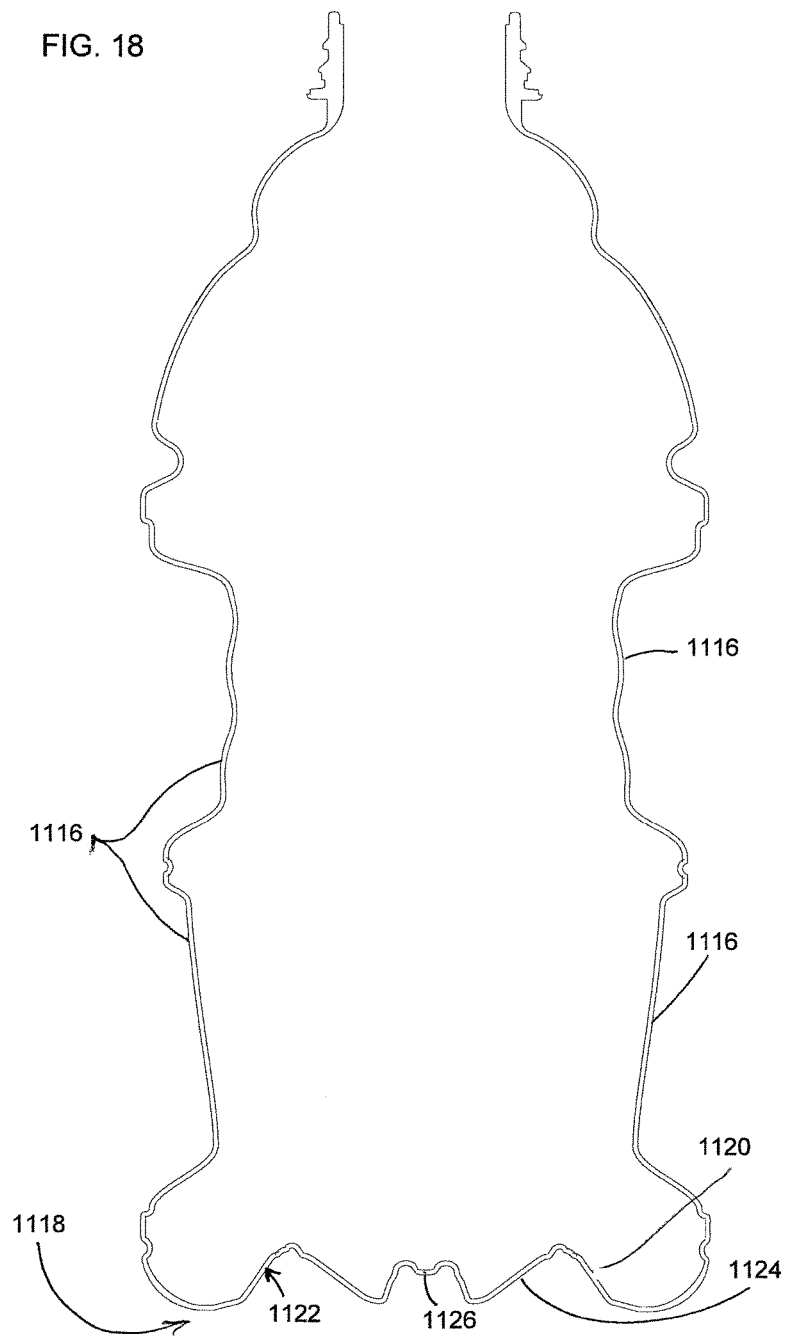
FIG. 18 is a side sectional view of a further exemplary embodiment of a plastic container according to the present inventions.
Figure 19:
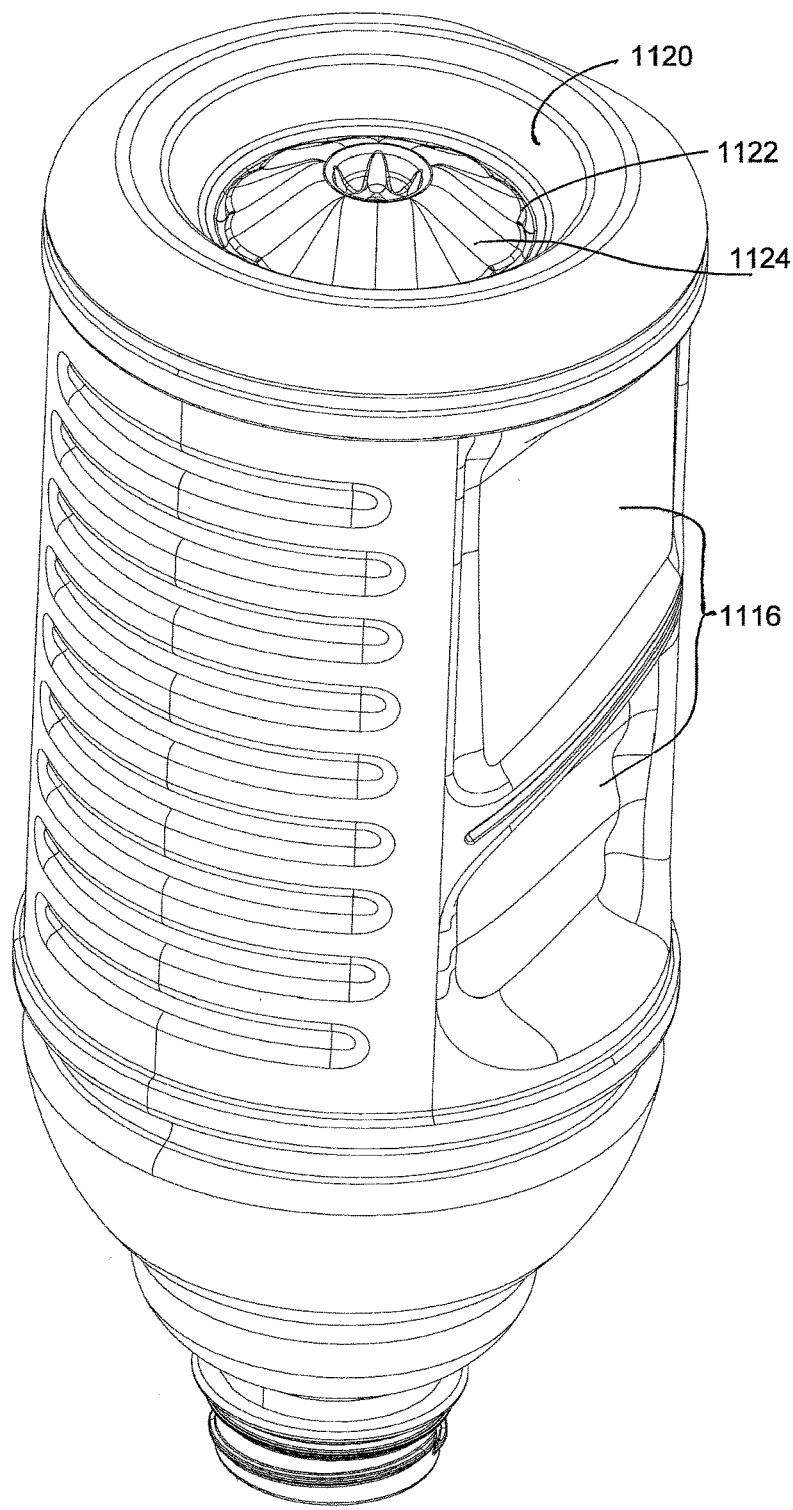
FIG. 19 is a lower isometric view of the container of FIG. 18.
Figure 20:
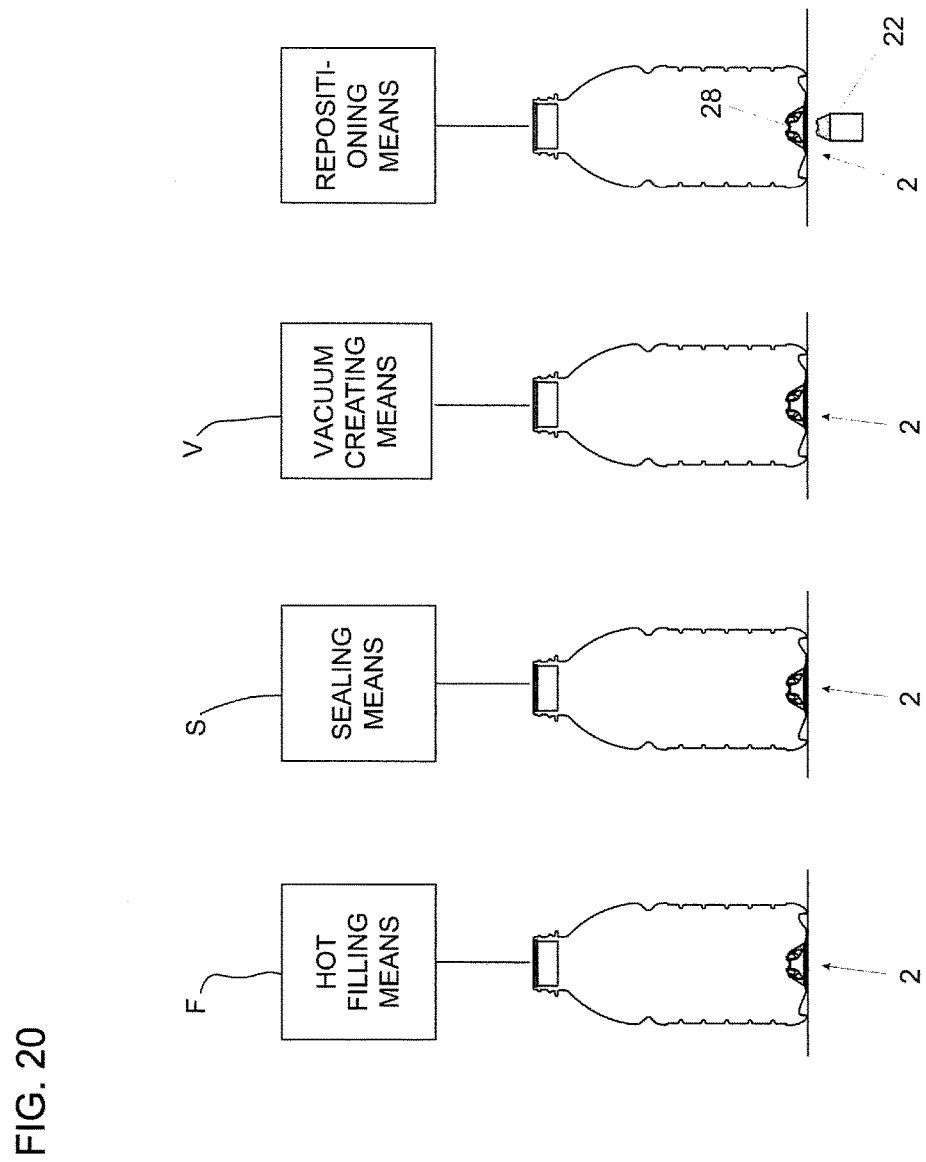
FIG. 20 is a schematic representation of a system for handling plastic containers.
Figure 21:
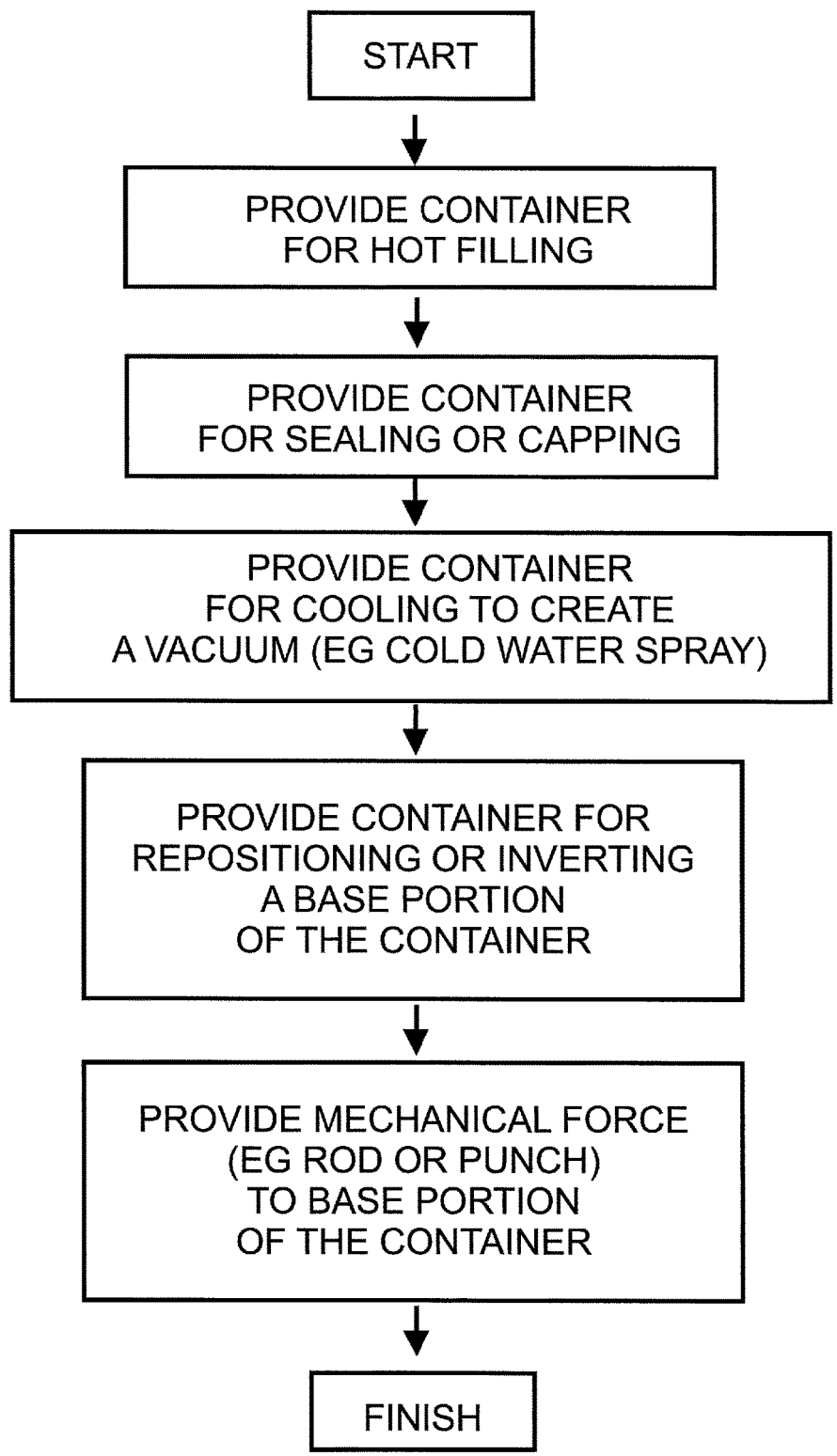
FIG. 21 is a schematic representation of handling plastic containers.

FIGS. 18 and 19 show another embodiment of a container that is substantially identical to the container of FIGS. 16 and 17 and again only points of difference will be described. Notably, in the embodiment of FIGS. 18 and 19, the first wall or instep 1120 is inclined at a lesser angle than in the embodiment of FIGS. 16 and 17. As will be appreciated, other angles of inclination may also be used.

The operation or preferred use of the containers of FIGS. 16 and 17, and FIGS. 18 and 19, is substantially identical to that described in relation to the embodiment of FIGS. 13 to 15.

Figures 11A, 11B, 11C, 11D, 11E:
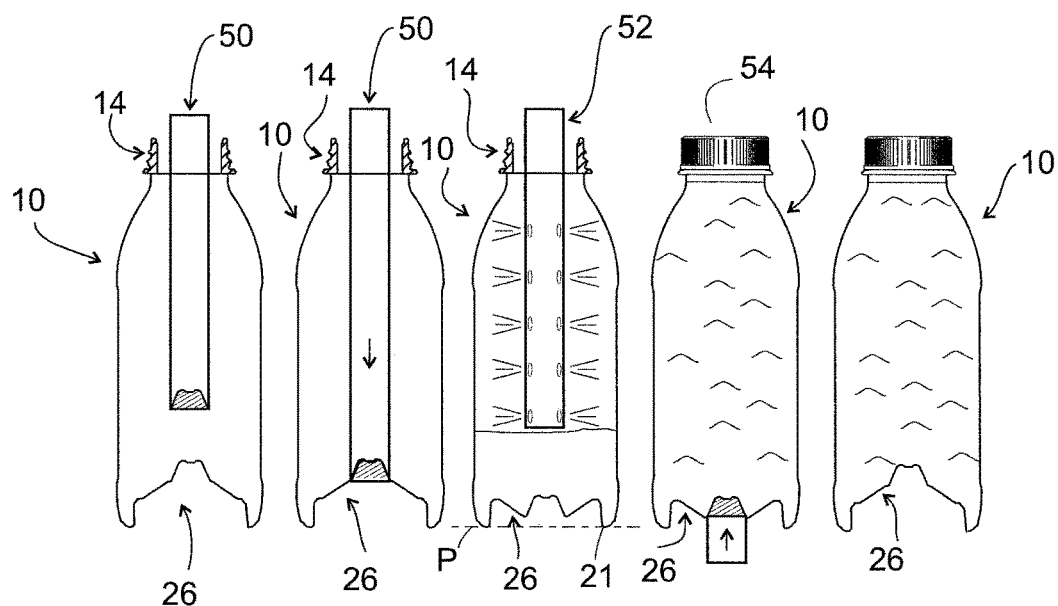
FIGS. 11A-E schematically illustrate an exemplary method of processing a plastic container according to the present invention.

Referring to FIGS. 11A-11E, an exemplary method of processing a plastic container according to the present invention is shown. Prior to processing, the container 10 may be formed (e.g., blow molded) with the pressure panel 26 in the inwardly-inclined position. According to this embodiment, a force can be applied to the pressure panel 26 in order to move the pressure panel 26 into the outwardly-inclined position. For example, as shown in FIGS. 11A and 11B, a first mechanical pusher 50 can be introduced through the opening in the container finish 14 and forced downwardly on the pressure panel 26 in order to move it to the outwardly-inclined position (shown in FIG. 11C). One of ordinary skill in the art will know that other types of mechanical or other forces can alternatively be used to move the pressure panel 26 into the outwardly-inclined position. Alternatively, the container 10 can be initially formed with the pressure panel 26 located in the outwardly-inclined position.

Referring to FIG. 11C, the container 10 can be filled with liquid contents when the pressure panel 26 is located in the outwardly-inclined position. Particularly, the container 10 can be "hot-filled" with the liquid contents at an elevated temperature, for example, 185.degree. C. As shown in FIG. 11C, the liquid contents can be introduced into the container 10 via a filling nozzle 52 inserted through the opening in the container finish 10, although one of ordinary skill in the art will know that any number of known filling devices and techniques can be implemented. According to an alternative embodiment, the first mechanical pusher 50 and the filling nozzle 52 can be the same instrument.

Referring to FIG. 11D, once the container 10 has been filled to the desired level, the filling nozzle 52 can be removed, and a cap 54 can be applied to the container finish 14. Any number of capping techniques and devices known in the art can be used to apply the cap 54 to the container finish 14. Next the container 10 can be cooled, for example, by spraying the container 10 with cool water, or alternatively, by leaving the container 10 in ambient conditions for a sufficient amount of time. As the container 10 and its contents cool, the contents tend to contract. This volumetric change inside the sealed container 10 can create a vacuum force within the container 10.

In order to alleviate all or a portion of the vacuum forces within the container 10, the pressure panel 26 can be moved from the outwardly-inclined position of FIG. 11D to the inwardly-inclined position of FIG. 11E. For example, following filling, capping, and cooling of the container 10, an external force can be applied to the pressure panel 26, for example, by a second mechanical pusher 56, as shown in FIG. 11D. Alternatively, the pressure panel 26 can be moved by the creation of relative movement of the container 10 relative to a punch or similar apparatus, in order to force the pressure panel 26 into the inwardly-inclined position. Alternatively, the pressure panel 26 can invert to the inwardly-inclined position under the internal vacuum forces within the sealed container 10. For example, all or a portion of the pressure panel 26 (e.g., the initiator portion) can be made flexible enough to cause the pressure panel 26 to invert under the internal vacuum forces.

The inversion of the pressure panel 26 from the outwardly-inclined position to the inwardly-inclined position reduces the internal volume of the container 10, and thereby increases the pressure inside the sealed container 10. This can alleviate any vacuum created within the container 10 due to the hot-fill process. This can also remedy any deformation of the container 10 that was caused as a result of the internal vacuum.

As shown in FIGS. 11A-E, the entire pressure panel 26 is above the plane P of the standing surface 21 (see FIG. 11C) of the container 10. As a result of this configuration, the containers 10 according to the present invention can be stored, transported, and capped/filled, etc., all while standing on the standing surface 21. This can eliminate the need for any adapters or other devices to stabilize the container 10 in the upright position. This can also make the containers 10 of the present invention more readily adapted for use with conventional, existing container transports, capping and filling stations, and storage facilities.

Referring to FIGS. 12A-C, an exemplary method of blow molding a plastic container according to the present invention is shown. Referring to FIG. 12A, the method includes enclosing a softened polymer material (such as PET, PEN, PP, blends thereof, and other suitable materials known in the art) within a blow mold. In the exemplary embodiment shown, the polymer material comprises a plastic container preform 60. However, according to an alternative embodiment, the polymer material can comprise a tube of extruded polymer material, for example, as used in the known process of "extrusion blow molding."

The blow mold can comprise two or more side mold portions 62, 64, and a base mold portion 66. The side mold portions 62, 64 can move from an open position (not shown) in which the side mold portions are separated from one another, to a closed position, shown in FIGS. 12A-C. In the closed position, shown, the side mold portions 62, 64 define a mold cavity 68 having an open bottom. The mold cavity 68 corresponds to the shape of a plastic container to be molded therein. The base mold portion 66 is located in the open bottom region of the mold cavity 68 and is movable with respect to the side mold portions 62, 64 in the vertical direction (as viewed in FIGS. 12A-C) between the retracted position shown in FIGS. 12A and 12B, and the extended position shown in FIG. 12C. Mechanical, pneumatic, hydraulic, or other means known in the art can be implemented to move the base mold portion 66 between the retracted and extended positions.

A stretch rod 70 can be inserted into the neck portion of the softened preform 60, and can be used to stretch or elongate the preform 60. Air or another medium can be expelled from the stretch rod 70 or other device to at least partially inflate the preform 60 into conformity with the mold cavity 68. Preferably, the preform 60 is inflated into substantially complete conformity with the mold cavity 68 while the base mold portion 66 is in the retracted position, as shown in FIG. 12B. This can eliminate the need for the polymer material to expand deeply into tight corners, narrow spaces, etc., that are associated with the deeply-set pressure panel of the present invention. This can avoid resultant thin or weak spots in the formed container.

While the polymer material is still in a softened state, the base mold portion 66 can be displaced upwardly into the mold cavity 68 to form a transverse pressure panel deeply set within the base portion of the plastic container (see, for example, the base 20 and pressure panel 26 of FIGS. 1-4). Air can continue to be expelled into the mold cavity during displacement of the base mold portion 66 to the extended position, or alternatively, the supply of air can be turned off. Referring to FIGS. 1-4, by "deeply set" it is meant that the pressure panel 26 is located entirely between the standing plane P and the upper portion 12 of the container when the pressure panel 26 is in the outwardly-inclined position (FIG. 2) and when it is in the inwardly-inclined position (FIG. 3). In the exemplary embodiment of FIGS. 12A-C, the base mold portion 66 moves substantially along the longitudinal axis of the plastic container being formed in the mold cavity 68, however, other orientations are possible.

Once the plastic container has been formed in the mold cavity 68, the base mold portion 66 can return to the retracted position, and the side mold portions 62, 64 can separate to release the formed container.

By utilizing the blow molding method of the present invention, it is possible to initially form the general container shape with a generally flat bottom portion, and then deflect the bottom upwardly at orientation temperature. As a result, the container base and deeply-set pressure panel can be of improved material thickness and uniformity. In addition, the base and pressure panel can be multi-axially stretch oriented to provide increased strength without the attendant thinness or weakness at the heel portion of the bottle.

The base of the plastic container according to the present invention is preferably crystallized to some extent. Some degree of crystallinity and/or biaxial orientation can be achieved normally during the blow molding process. However, crystallization can be promoted through heat setting of the container. For example, the walls and base of the mold can be held at an elevated temperature to promote crystallization. When the container is heat set at a temperature of about 180.degree. F., the container sidewalls, base, pressure panel, etc., can be typically crystallized to about 20%. This degree of crystallinity is typical for a blow molding process and does not represent a significant amount of heat setting or increased crystallinity or orientation, as compared with a typically prepared container. However, the properties of the base and pressure panel of the present invention can be advantageously enhanced by heat setting the container, and particularly the base and pressure panel, at ever higher temperatures. Such temperatures can be, for example, greater than 250.degree. F. and can be 325.degree. F. or even higher. When these elevated heat set temperatures are utilized, crystallinity can be increased to greater than 20% or 25% or more. One drawback of increasing crystallinity and biaxial orientation in a plastic container is that this process introduces opacity into the normally clear material. However, unlike bases in prior art containers, which can require a crystallinity of 30% or more, utilizing crystallinities of as low as 22-25% with a base structure according to the present invention can achieve significant structural integrity, while maintaining the substantial clarity of a base that is preferred by manufacturers, packagers and consumers.

U.S. Pat. Nos. 4,465,199; 3,949,033; 4,378,328; and 5,004,109, all of which are incorporated herein by reference, disclose further details relating to blow molding methods utilizing displaceable mold portions. The methods disclosed in these references can also be implemented to form plastic containers according to the present invention. According to an alternative embodiment of the invention, the plastic container can be removed from the blow mold prior to forming the deeply-set pressure panel. Outside of the mold, the pressure-panel and related structure(s) can be formed in the base of the plastic container using a mandrel or similar device. U.S. Pat. No. 4,117,062, the entire content of which is incorporated herein by reference, provides further details on this type of post-mold processing.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method of compensating for vacuum pressure changes within a container, the container having a longitudinal axis and a neck portion, a body portion, and a base portion, the base portion forming a standing surface for the container and having a bottom end thereof with a recess or instep adjacent the standing surface, a hinge and a pressure panel, the pressure panel having a portion outwardly inclined greater than about 10 degrees relative to a plane perpendicular to the longitudinal axis, wherein the pressure panel is adapted to be repositioned about the hinge from a first position extending outwardly to a second position extending inwardly, the method comprising:
   hot-filling the container with a product;
   sealing the container with a closure;
   cooling the hot-filled container to create a vacuum within the sealed container; and
   repositioning the pressure panel about the hinge from the first position to the second position, thereby reducing the vacuum pressure within the container,
   wherein after repositioning, the container is adapted to stand upright on a flat surface; and
   wherein the pressure panel includes a plurality of projections or flutes to facilitate repositioning thereof, the projections or flutes being adapted to flex during repositioning of the base wall.

2. The method of claim 1, wherein the body portion includes one or more strengthening ribs and/or a portion that deforms in response to vacuum pressure during cooling of the container.

3. The method of claim 2, wherein the portion of the body portion includes a vacuum panel.

4. The method of claim 2, wherein said repositioning reduces a portion of the internal vacuum pressure and the deformation of the body portion reduces a portion of the internal vacuum pressure.

5. The method of claim 4, wherein said body portion includes one or more vacuum panels or grips and reduces a portion of the internal vacuum pressure prior to said repositioning.

6. The method of claim 1, wherein the recess or instep is recessed to such an extent the entire pressure panel in the first position is above the standing surface of the container.

7. The method of claim 1, wherein the pressure panel includes a central push-up portion, the push-up portion circumscribed by the projections or flutes.

8. The method of claim 7, wherein said repositioning involves a mechanical device operable to apply a force to the central push-up portion to reposition the pressure panel from the first position to the second position.

9. The method of claim 1, wherein the second position of the pressure panel is arranged more toward the interior of container than the first position.

10. A system for hot-filling containers, each said container having a longitudinal axis and including a neck portion, a body portion, and a base portion, and the base portion forming a standing surface for the container and having a bottom end thereof with a recess or instep adjacent the standing surface, a hinge, a pressure panel having a central push-up portion, the pressure panel having a portion outwardly inclined greater than about 10 degrees relative to a plane perpendicular to the longitudinal axis, wherein the pressure panel is adapted to be repositioned about the hinge, the system comprising:
    filling means for filling the containers with a heated product;
    sealing means for sealing the filled containers using a cap;
    vacuum creating means for creating a vacuum in each of the filled and sealed containers by cooling; and
    repositioning means for repositioning the pressure panel and the push-up portion of each container from the first position to a second position to reduce the vacuum,
    wherein after repositioning, the container is adapted to stand upright on a flat surface; and wherein the pressure panel includes a plurality of projections or flutes to facilitate repositioning thereof, the projections or flutes being adapted to flex during repositioning of the base wall.

11. The system of claim 10, wherein the repositioning is done after the containers are conveyed by a conveying portion.

12. The system of claim 11, wherein the body portion includes a portion that deforms in response to vacuum pressure.

13. The system of claim 12, wherein the portion of the body portion that deforms reduces a portion of the vacuum.

14. The system of claim 13, wherein the portion of the body portion that deforms includes at least one vacuum panel.

15. The system of claim 14, wherein the projections or flutes are inwardly or outwardly projecting.

16. The system of claim 14, wherein the at least one vacuum panel is configured to form a grip region.

17. The system of claim 14, wherein said repositioning means is a mechanical pusher or punch operable to apply a force to the push-up portion to reposition the pressure panel and the push-up portion from the first position to the second position.

18. The system of claim 14, wherein, the second position of the push-up portion is arranged more toward the interior of the container than the first position.

19. The system of claim 10, including conveying the containers having vacuums created therein wherein, in the first position, the recess or instep is recessed to such an extent the pressure panel is entirely above the standing surface of the base portion of the container.

20. A method for hot-filling a plastic container, the container having a longitudinal axis and including a neck portion, a body portion, and a base portion, the base portion forming a standing surface for the container and having a bottom end thereof with a recess or instep adjacent the standing surface, a hinge and a pressure panel having a centrally located push-up portion, the pressure panel having a portion outwardly inclined greater than about 10 degrees relative to a plane perpendicular to the longitudinal axis, wherein the pressure panel is adapted to be inverted about the hinge from a first position extending outwardly to a second position extending inwardly, the method comprising:
    hot-filling the plastic container;
    capping the hot-filled plastic container;
    creating an internal vacuum in the hot-filled and capped plastic container by cooling;
    inverting the pressure panel to reduce a portion of the internal vacuum,
    wherein after inverting, the container is adapted to stand upright on a flat surface; and wherein the pressure panel includes a plurality of projections or flutes to facilitate inverting, the projections or flutes being adapted to flex during inversion of the base wall.

21. The method of claim 20, comprising transporting the plastic container having the internal vacuum.

22. The method of claim 21, wherein the body includes at least one portion that deforms in response to vacuum pressure, and the inverting of the pressure panel reduces a portion of the internal vacuum.

23. The method of claim 22, wherein the instep is recessed to such an extent the entire pressure panel is contained above the standing surface of the container during said transporting.

24. A system for hot-filling containers, each said container having a longitudinal axis and including a neck portion, a body portion, and a base portion, the base portion forming a standing surface for the container and having a bottom end thereof with a recess or instep adjacent the standing surface, a hinge, a pressure panel having a central push-up portion, the pressure panel having a portion outwardly inclined greater than about 10 degrees relative to a plane perpendicular to the longitudinal axis, wherein the pressure panel is adapted to be repositioned about the hinge from a first position extending outwardly to a second position extending inwardly without repositioning the instep portion, the system comprising:
    filling means for filling the containers with a product, the product being at an elevated temperature;
    sealing means for sealing the filled containers using a cap;
    vacuum creating means for creating a vacuum in each of the filled and sealed containers by cooling; and
    repositioning means for repositioning the pressure panel and the push-up portion of each container from the first position to a second position partially to reduce the vacuum, wherein the pressure panel includes a plurality of projections or flutes to facilitate repositioning thereof, the projections or flutes being adapted to flex during repositioning of the pressure panel.

25. The system of claim 24, wherein, in the first position, the recess or instep is recessed to such an extent no portion of the pressure panel and the push-up portion extend below the standing surface of the base portion of the container.

26. The system of claim 25 further comprising a conveying portion for conveying the containers between the steps of filling and sealing the containers, and between the steps of cooling the containers and repositioning the pressure panels of the containers having vacuums created therein.

27. The system of claim 24, wherein said repositioning means is a mechanical device operable to apply a force to the push-up portion to reposition the pressure panel and the push-up portion from the first position to the second position.

28. The system of claim 24, wherein, the second position of the push-up portion is arranged more toward the interior of container than the first position.

29. The system of claim 24 further comprising a conveying portion for conveying the containers.

30. A method for hot-filling a plastic container comprising:
hot-filling the plastic container, the plastic container having a longitudinal axis and including a neck portion, a body portion and a base portion, the base portion forming a standing surface for the container and having a bottom end thereof with a recess or instep adjacent the standing surface, a hinge and a pressure panel, the pressure panel having a central push-up portion, the pressure panel having a portion outwardly inclined greater than about 10 degrees relative to a plane perpendicular to the longitudinal axis, wherein the pressure panel is adapted to be inverted about the hinge from a first position extending outwardly to a second position extending inwardly and wherein the pressure panel includes a plurality of projections or flutes to facilitate the inverting, the projections or flutes being adapted to flex during the inverting;
capping the hot-filled plastic container;
creating an internal vacuum in the hot-filled and capped plastic container by cooling;
transporting the plastic container having an internal vacuum; and
inverting the pressure panel from a first position extending outwardly to a second position extending inwardly to reduce the internal vacuum.

31. The method of claim 30, wherein during said hot filling, said capping, said creating a vacuum, said transporting, and said inverting, the instep is recessed to such an extent the entire pressure panel is above the standing surface at all times.

32. The method of claim 30, wherein during said inverting, a mechanical pusher, or the like engages with the central push-up portion.

33. The method of claim 30, wherein the standing surface circumscribes the instep, the instep circumscribes the hinge, the hinge circumscribes the pressure panel, and said inverting of the pressure panel from a first position to a second position is performed without repositioning of the instep, and such that the pressure panel moves about the hinge toward the interior of the container.

34. The method of claim 33, wherein the pressure panel includes radial projections or fluting to increase rigidity.

35. The method of claim 30, wherein the recess or instep is recessed to such an extent said transporting includes the pressure panel being above the standing surface of the plastic container at all times.

* * * * *